(12) United States Patent
Fujita et al.

(10) Patent No.: US 6,929,405 B2
(45) Date of Patent: Aug. 16, 2005

(54) OPTICAL COMMUNICATION MODULE AND SINGLE FIBER BI-DIRECTIONAL OPTICAL COMMUNICATION MODULE

(75) Inventors: Hideaki Fujita, Shiki-gun (JP); Yorishige Ishii, Yamatotakada (JP); Toshihiro Tamura, Shiki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 289 days.

(21) Appl. No.: 10/335,674

(22) Filed: Jan. 2, 2003

(65) Prior Publication Data

US 2003/0133674 A1 Jul. 17, 2003

(30) Foreign Application Priority Data

Jan. 15, 2002 (JP) ...................................... 2002-006532

(51) Int. Cl.[7] .................................................. G02B 6/43
(52) U.S. Cl. ........................................ 385/89; 385/92
(58) Field of Search .............................. 385/31, 33, 49, 385/88, 89, 93; 398/139

(56) References Cited

U.S. PATENT DOCUMENTS 6,353,491 B1 * 3/2002 Tanaka et al. ............... 398/139

FOREIGN PATENT DOCUMENTS

| JP | 62-222211 | 9/1987 |
| JP | 63-090866 | 4/1988 |
| JP | 01-108511 | 4/1989 |
| JP | 2000-180601 | 6/2000 |

* cited by examiner

*Primary Examiner*—Frank G. Font
*Assistant Examiner*—Michael P. Mooney
(74) *Attorney, Agent, or Firm*—David G. Conlin; William J. Daley, Jr.; Edwards & Angell, LLP

(57) ABSTRACT

An optical communication module in accordance with the present invention includes: an optical fiber; a light-receiving device for converting the beams of light emitted from the optical fiber to an electric signal; and a receiving optical section for coupling at least a part of the beams of light emitted from the optical fiber with the light-receiving device. The receiving optical section includes: a collecting optical system for directing at least a part of the beams of light emitted from the optical fiber to the light-receiving device; and an interference restraining section for restraining module-reflected beams of light reflected in a part of the optical communication module from being coupled with the optical fiber, the interference restraining section being provided in an area irradiated with at least a part of the module-reflected beams of light. The optical communication module and a single fiber bi-directional optical communication module using the same realize full-duplex communications using a single optical fiber, a high SN ratio, and the reduction of costs and the size thereof.

19 Claims, 16 Drawing Sheets

OPTICAL COMMUNICATION MODULE AND SINGLE FIBER BI-DIRECTIONAL OPTICAL COMMUNICATION MODULE

FIELD OF THE INVENTION

The present invention relates to an optical communication module which enables to transmit/receive an optical signal using an optical fiber as a transmission medium, and a single fiber bi-directional optical communication module which enables to bi-directionally transmit/receive an optical signal using a single optical fiber.

BACKGROUND OF THE INVENTION

As illustrated in FIG. 16, an optical communication link 3 includes an optical fiber 2 and optical communication modules 1. The optical fiber 2 is provided for transmitting modulated light which is suitable for optical transmission, in accordance with a data signal to be transmitted, and the optical communication modules 1 are connected to the respective ends of the optical fiber 2 so as to be optically coupled therewith.

There are several types of the optical communication link 3, classified according to the modes of communications. The modes of communications are roughly grouped under the following types: ① the optical fiber 2 is either a single fiber or a plurality of fibers; ② a signal is transmitted either bi-directionally or single-directionally; ③ a signal is transmitted either simultaneously (in a full-duplex manner) or in a half-duplex manner, etc. Optical communications are generally carried out by using more than one of the foregoing types in combination (e.g. single fiber full-duplex communications).

A full-duplex communications method using a plurality of optical fibers has conventionally had such a problem that the downsizing of an optical communication module is difficult and the costs of an optical fiber increase as the transmission distance is lengthened.

For these reasons, optical communication modules by which full-duplex optical communications can be carried out using a signal optical fiber (single fiber full-duplex method) have been proposed. In particular, since a plastic optical fiber (hereinafter, this will be referred to as POF) recently has realized the reduction of losses and has been adoptable to broadband communications, the single fiber full-duplex optical communication modules have been applied to home networking and communications between electronic devices. As the POF is around 1 mm in diameter so as to be a large-diameter fiber, the same can be easily connected to an optical communication module and hence the use of the POF makes it possible to manufacture an optical communication link in which an optical fiber is easily detachable/attachable from/to an optical communication module.

In the case of an optical communication module which carries out the full-duplex communications using a single optical fiber, a single optical fiber is used for both receiving and transmitting, so it is critical to restrain (preferably prevent) interference between outgoing light and incoming light, that is, light sent out to the second party involved in communications and light sent in from that party. The interference between outgoing light and incoming light occurs primarily in the following four situations: ① The outgoing beams of light are reflected at the end face of an optical fiber, on the occasion of entering the optical fiber. (Hereinafter, this particular reflection will be referred to as "near end reflection."); ② The outgoing beams of light are reflected at the end face of an optical fiber, when the beams of light which have been transmitted through the optical fiber exits the optical fiber. (Hereinafter, this particular reflection will be referred to as "far end reflection."); ③ The beams of light are reflected in the optical communication module located at the far end of the line. (Hereinafter, this particular reflection will be referred to as "far end module reflection."); and ④ The beams of light are scattered inside the optical communication module. (Hereinafter, this phenomenon will be referred to as "internal scattering."). In addition, electric and electromagnetic interferences also cause problems.

Moreover, in an optical communication link using an optical fiber as a transmission medium, it is critical to couple incoming light exiting the optical fiber with a light-receiving device highly efficiently, in order to acquire a high SN (signal-to-noise) ratio.

Enlarging the light-receiving surface of the light-receiving device enables to improve reception efficiency. However, since the stray capacitance of the light-receiving device increases as the light-receiving surface thereof is enlarged, it is necessary to reduce the size of the light-receiving surface in order to restrain adverse effects caused by the stray capacitance, as transmission rate increases. On this account, it is difficult to couple incoming light with a light-receiving device in a highly efficient manner.

To couple an optical fiber with a light-receiving device, there is a conventional method arranged in such a manner that an optical system such as a lens and a mirror is provided between the optical fiber and the light-receiving device, and incoming light emitted from the optical fiber is collected so as to be coupled with the light-receiving device.

In particular, Japanese Laid-Open Patent Application No. 63-90866/1988 (Tokukaisho 63-90866; published on Apr. 21, 1988) and Japanese Laid-Open Patent Application No. 2000-180601 (Tokukai 2000-180601; published on Jun. 30, 2000) disclose methods for coupling an optical fiber with a semiconductor device (such as a light-emitting device and a light-receiving device) using a collection mirror having a curved surface such as spheroid. These methods enables to couple an optical fiber with a semiconductor device highly efficiently.

That is to say, the light-emitting point of the optical fiber and the light-receiving device (light-emitting device) are provided at respective two focal points of the spheroid, so that almost 100% of the beams of light emitted from the optical fiber can be collected by the light-receiving device.

However, it is noted that, in the methods disclosed by Japanese Laid-Open Patent Application No. 63-90866/1988 and Japanese Laid-Open Patent Application No. 2000-180601, the light reflected in the light-receiving device is then reflected in the collection mirror again, and hence it is highly likely that the light returns to the optical fiber as reflected light. This reflected light is transmitted via the optical fiber and causes adverse effects on an optical communication module located at the far end of the line. For instance, the return of the reflected light to the light-emitting device located at the far end of the line makes the oscillation of the light-emitting device unstable. Especially, when carrying out the single fiber full-duplex communications, the interferences because of the far-end module reflection increase as described above, and this causes the decrease of the SN ratio.

Moreover, in the case of the forgoing methods using a collection mirror, since it is not possible to simultaneously provide both of a receiving optical system and a transmitting optical system, there is no space available for providing the transmitting optical system when, for instance, a collection mirror is provided as the receiving optical system, and hence it is impossible to adopt these methods to the single fiber full-duplex communications.

SUMMARY OF THE INVENTION

To solve the problems above, the object of the present invention is to offer (i) an optical communication module of high reception efficiency, low-cost, and small-size, which enables to: restrain the beams of light, which are reflected in a light-receiving device, from returning to an optical fiber again: carry out full-duplex bi-directional communications by a single optical fiber; and acquire a high SN ratio thanks to low optical and electric interferences caused by far end module reflection, near end reflection, and internal scattering, and (ii) a single fiber bi-directional optical communication module using the same.

To achieve the foregoing objective, the optical communication module in accordance with the present invention is characterized in that a receiving optical section, which is for coupling the beams of light emitted from an optical fiber with a light-receiving device, includes: a collecting optical system for directing at least a part of beams of light, which is emitted from the optical fiber, to the light-receiving device; and at least one interference restraining section for restraining module-reflected beams of light reflected in a part of the optical communication module from being coupled with the optical fiber, the at least one interference restraining section being provided in an area irradiated with at least a part of the module-reflected beams of light.

According to this arrangement, incoming light is efficiently coupled with the light-receiving device by the collecting optical system and the interference restraining section restrains the module-reflected beams of light from being coupled with the optical fiber again, and hence it is possible to reduce adverse effects of the returned light on the module located at the far end of the line, so as to acquire an optical communication link which stably operates.

To achieve the foregoing objective, the single fiber bi-directional optical communication module in accordance with the present invention, used for an optical communication link which transmits or receives an optical signal using a single optical fiber, is characterized by comprising: a light-emitting device for generating outgoing light; a light-receiving device for receiving beams of light emitted from the optical fiber; a transmitting optical section for coupling the beams of light emitted from the light-emitting device with the optical fiber; and the forgoing receiving optical section for coupling the beams of light emitted from the optical fiber with the light-receiving device.

With this arrangement, it is possible to acquire a single fiber bi-directional optical communication module which can correspond to single fiber full-duplex communications and has high reception efficiency, and in which interference due to far end module reflection is low.

For a fuller understanding of the nature and advantages of the invention, reference should be made to the ensuing detailed description taken in conjunction with the accompanying drawings.

BRIEF DESCRIPTION OF THE DRAWINGS

FIG. 6(a) illustrates the conventional art while FIG. 6(b) illustrates the present invention.

DESCRIPTION OF THE EMBODIMENTS

[First Embodiment]

Figure 1:
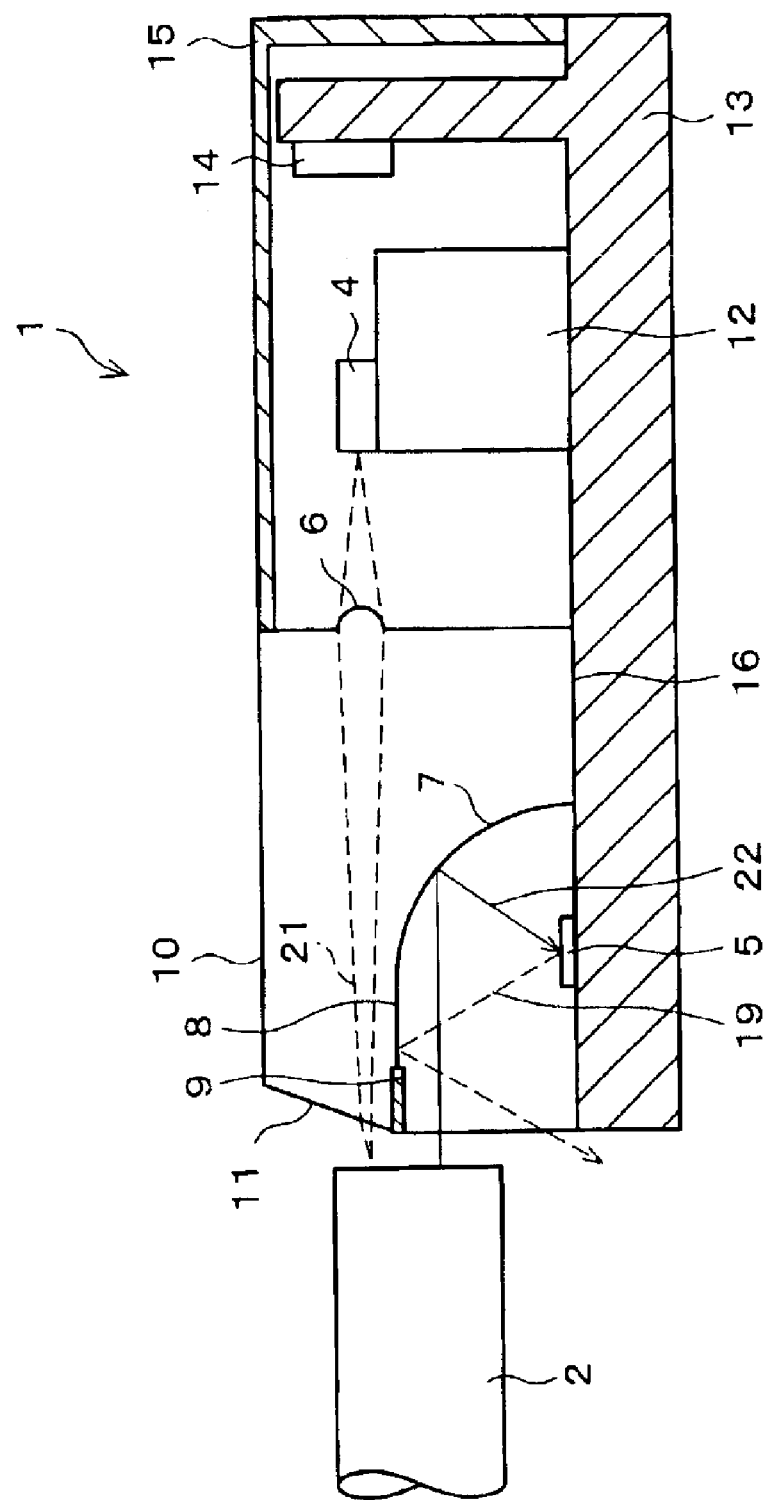
FIG. 1 is a schematic view, illustrating an arrangement of First Embodiment of an optical communication module in accordance with the present invention.
Figure 2:
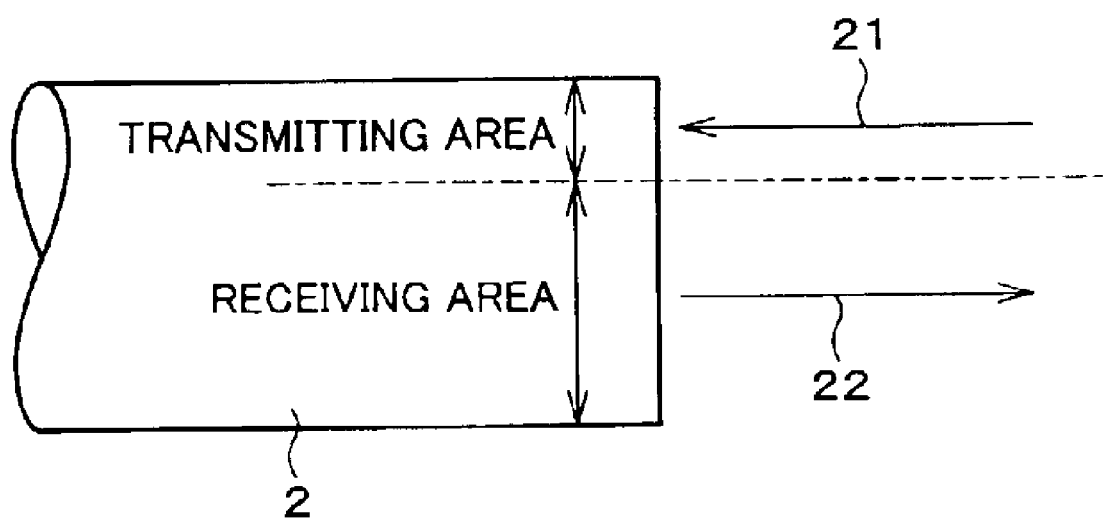
FIG. 2 is a schematic view, illustrating a transmitting area and a receiving area of the optical communication module in accordance with the present invention.

Referring to FIG. 1, First Embodiment in accordance with the present invention will be described. In this embodiment, as illustrated in FIGS. 1 and 2, an optical communication module 1 which can be used for single fiber full-duplex communications and a single fiber bi-directional optical communication module using the optical communication module 1 will be described.

The optical communication module 1 includes: a light emitting device 4 for generating outgoing beams of light 21 which are the light modulated in accordance with a data signal; a light-receiving device 5 which receives the incoming beams of light 22 from an optical fiber 2 so as to generate the data signal; a transmitting lens (transmitting optical system) 6 which collects the outgoing beams of light 21 emitted from the light-emitting device 4, and couples the outgoing beams of light 21 with the optical fiber 2; an incoming light reflecting mirror (collecting optical system) 7 which reflects the incoming beams of light 22 emitted from the optical fiber 2, and couples the incoming beams of light 22 with the light-receiving device 5; and an interference preventing section (interference restraining section) 8 which is a horizontal section continued from the curved surface of the incoming light reflecting mirror 7 in FIG. 1 and prevents a reflected beam of light 19 which is reflected in the light-receiving device 5 from being coupled with the optical fiber 2. The horizontal section is in parallel with an optical axis of the end face of the optical fiber 2 connected to the optical communication module 1.

The transmitting lens 6, the incoming light reflecting mirror 7, and the interference preventing section 8 are all formed in an optical member 10. The light-emitting device 4 is provided on a sub-mount 12 made of materials which excel in heat radiation, such as SiC. These members are provided so as to be aligned on a stem 13. The stem 13 is electrically connected to a circuit which is not illustrated.

The outgoing beams of light 21 generated by the light-emitting device 4 are emitted in a radial pattern according to the radiation angle of the light-emitting device 4. Then the outgoing beams of light 21 acquire an arbitrary numerical aperture by the transmitting lens 6 so as to be collected, and after passing through the optical member 10 which is light-transmitting, the outgoing beams of light 21 are consequently coupled with the optical fiber 2. By the incoming light reflecting mirror 7, most of the incoming beams of light 22 emitted from the optical fiber 2 are reflected to the light-receiving device 5, so as to be collected by the incoming light reflecting mirror 7 which has curvature, and consequently the incoming beams of light 22 are coupled with the light-receiving device 5. The optical member 10 is in the form of block, and made of materials which excel in formability and light-transmitting property, such as PMMA.

In this manner, on the occasion of spatially separating the outgoing beams of light 21 from the incoming beams of light 22 in the aperture of the optical fiber 2, among the incoming beams of light 22 emitted from the optical fiber 2, an incoming beam of light 22, which is emitted from the area at which the outgoing beams of light 21 enter, is not coupled with the light receiving device 5. Thus, when the area (transmitting area) of the optical fiber 2, at which the outgoing beams of light 21 enter, is provided so as to be closer to the periphery of the optical fiber 2 and smaller in size, it is possible to enlarge the receiving area on the end face of the optical fiber 2 except the transmitting area, and hence the incoming beams of light 22 can be efficiently coupled with the light-receiving device 5.

The optical member 10 is provided with a prism section 11 tilted with respect to the optical axis of the optical fiber 2, on the surface for emitting the outgoing beams of light 21, so that the outgoing beams of light 21 are refracted so as to enter the optical fiber 2. Also, a part of the interference preventing section 8 (i.e. shade section 9) is provided so as to be either in touch with or close to the optical fiber 2.

Here, although the shade section 9 is emphasized by oblique lines in FIG. 1, the shade section 9 is a part of the interference preventing section 8, so as to be incapable of being separated from the interference preventing section 8.

The incoming light reflecting mirror 7 and the interference preventing section 8 are both formed by a reflecting mirror composed of a thin film.

A part of the outgoing beams of light 21 entering the optical fiber 2 is reflected in the end face of the optical fiber 2. This outgoing beam of light 21 reflected in the optical fiber 2 is shaded by (the shade section 9 of) the interference preventing section 8 so as not to be coupled with the light-receiving device 5, and hence the interference due to the near end reflection can be prevented.

The optical communication module 1 in accordance with the present invention is characterized by comprising the interference preventing section 8. This interference preventing section 8 mainly has the following four functions: ① to secure an area through which the outgoing light passes in order to correspond to single fiber bi-directional communications, and to acquire a large receiving area; ② to optically separate the transmitting section from the receiving section so as to reduce the interferences due to the near end reflection and the internal scattering; ③ to reduce the interference due to the far end module reflection; and ④ to reduce electric and electromagnetic interferences.

Now, these functions will be described one after another. First, a method of separating the transmitting area from the receiving area is described in reference to FIGS. 2 and 3.

When spatially separating the incoming light from the outgoing light by a single optical fiber 2, as FIG. 2 illustrates, reducing the transmitting area at which the outgoing beams of light 21 are coupled with the optical fiber 2 enables to enlarge the receiving area, and hence available incoming beams of light 22 are increased. For this reason, it is possible to acquire an optical communication module 1 having high reception efficiency.

To achieve this, it is critical to separate the outgoing beams of light 21 from the incoming beams of light 22 with the smallest possible loss of light. The conventional method using a collection mirror only allows the receiving optical system to be provided, so as not to be capable of corresponding to the single fiber bi-directional communications.

In the present embodiment, the outgoing beams of light 21 pass through the side (the upper side of FIG. 1) opposite to the side where the light-receiving device 5 of the incoming light reflecting mirror 7 which functions as a conventional collection mirror is provided, so that the present embodiment is capable of corresponding to the single fiber bi-directional communications.

Figure 3:
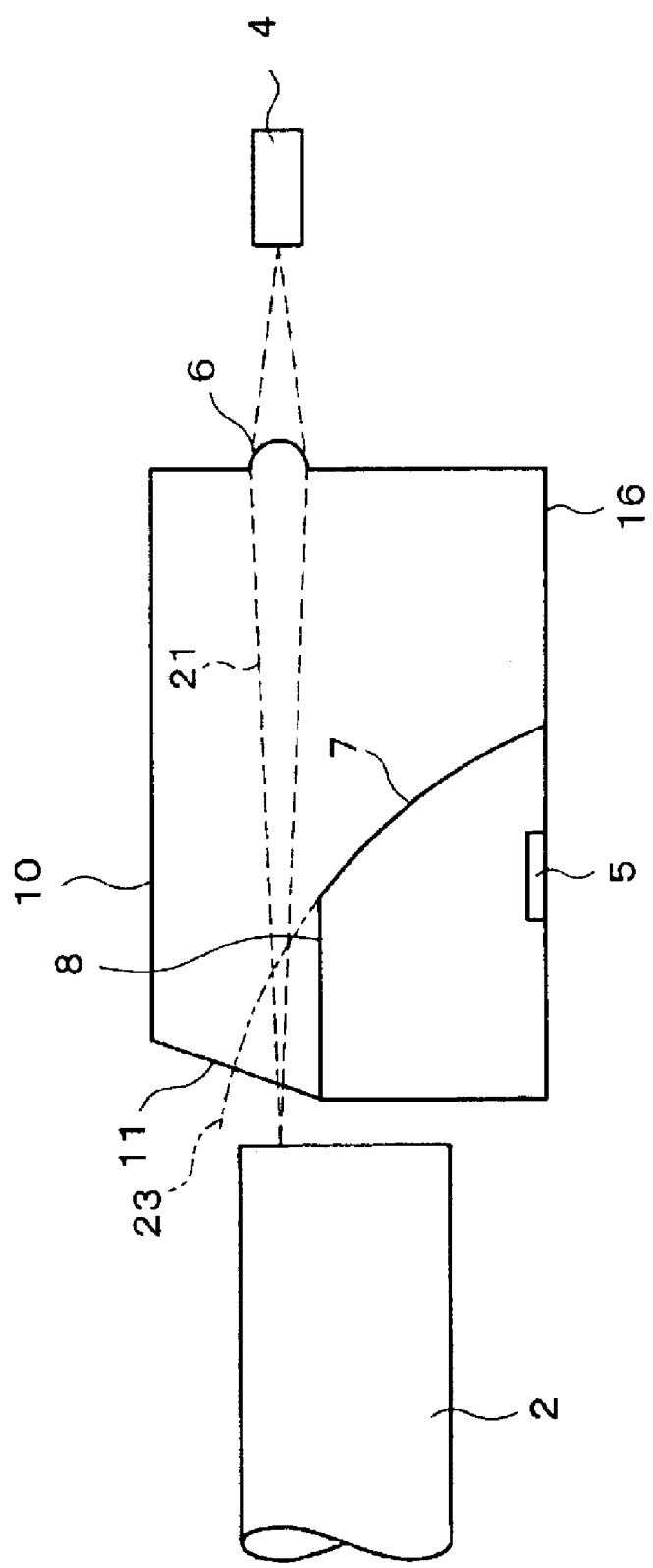
FIG. 3 is a schematic view, illustrating the method of separating the transmitting area from the receiving area.

Moreover, as illustrated in FIG. 3, the curvature of the interference preventing section 8 is set so as to be different from the curvature of the incoming light reflecting mirror 7, and the interference preventing section 8 does not intervene the light path of the outgoing beams of light 21 on the upper side of FIG. 3 (the side through which the outgoing beams of light 21 pass). With this arrangement, the area in the optical member 10, through which the outgoing beams of light 21 pass, is secured.

When a conventional collection mirror 23 (indicated by chain double-dashed lines in FIG. 3) is adopted, because of the interference between the collection mirror 23 and the outgoing beams of light 21, the collection mirror 23 is required to be placed on a lower area in FIG. 3, and this causes the receiving area, which is illustrated in FIG. 2, to be smaller so that the reception efficiency is deteriorated.

In contrast, in the method of the present embodiment, since the outgoing light is separated from the incoming light by means of the thin-film incoming light reflecting mirror 7 and the interference preventing section 8, the loss of light in the separating section is virtually zero. Moreover, since it is possible to allow the outgoing beams of light 21 to pass the immediate vicinity of the incoming light reflecting mirror 7 and the interference preventing section 8, the border between the transmitting area and the receiving area can be almost eliminated and the receiving area can be further enlarged.

Further, in the method of the present embodiment, since the outgoing beams of light 21 are refracted by the prism section 11 in the direction from the periphery of the optical fiber 2 to the central part thereof (to the optical axis which is the central axis of the optical fiber 2) so as to enter the optical fiber 2, it is possible to move the transmitting area even closer to the circumference of the optical fiber 2, so that the receiving area can be further enlarged and higher reception efficiency can be acquired.

Figure 4:
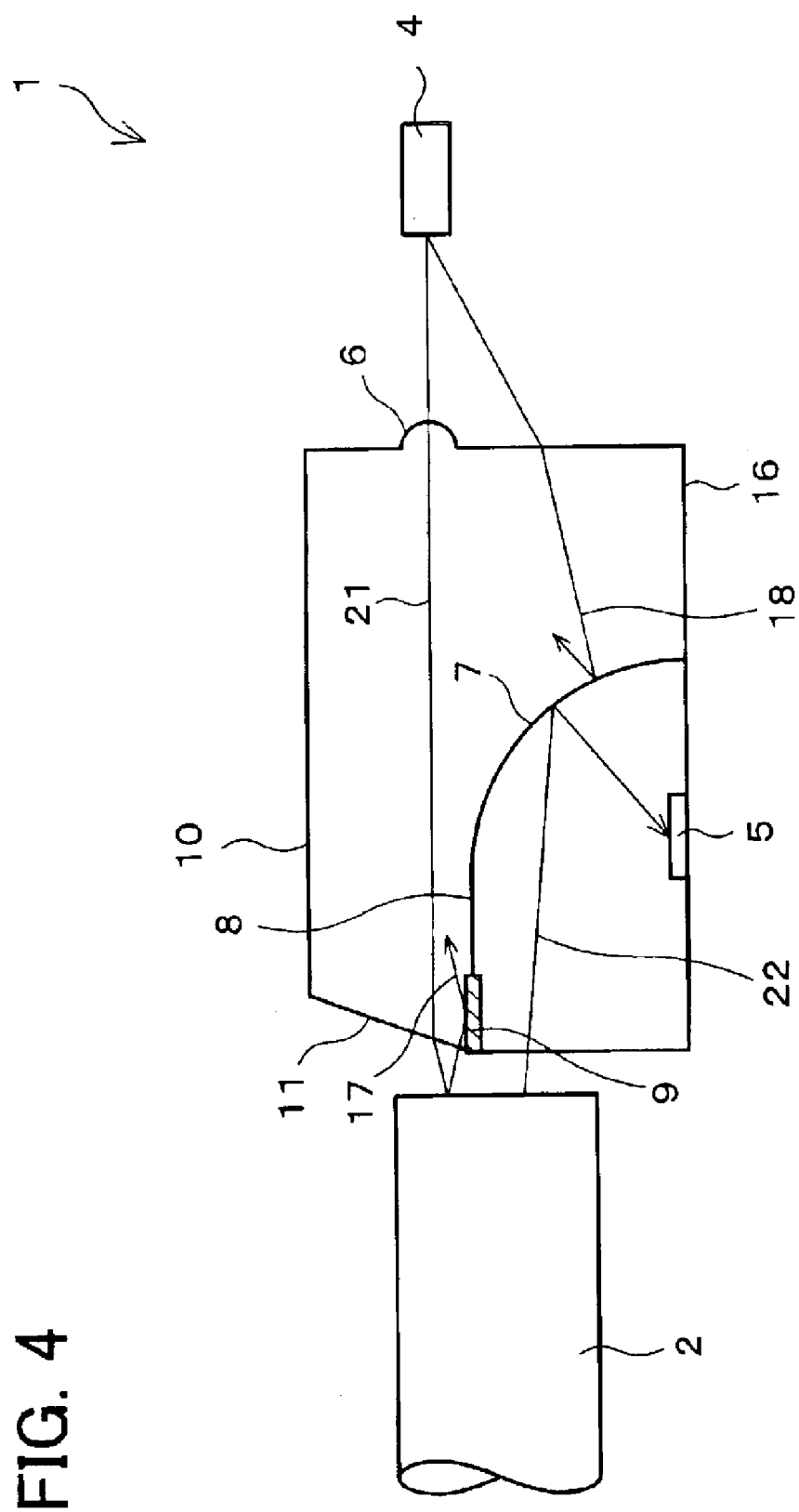
FIG. 4 is a schematic view, describing the method of preventing the interference due to internal scattering in the optical communication module in accordance with the present invention.

Next, the principle of preventing the interferences due to the near end reflection and the internal scattering is discussed in reference to FIG. 4. The outgoing beams of light 2 1 are refracted by the prism section 11 of the optical member 10, so as to enter the optical fiber 2 from the circumference thereof. The reflected beams of light of the outgoing beams of light 21, which are termed reflected beams of light 17, are reflected in the direction to the central part of the optical fiber 2.

The shade section 9, which is the edge of the prism section 11 of the optical member 10 and also a part of the interference preventing section 8, is either in touch with or several tens of $\mu$m to several hundreds of $\mu$m away from the optical fiber 2, and hence the reflected beams of light 17 are reflected in (shaded by) the surface (shade section 9) opposite to the side where the light-receiving device 5 of the interference preventing section 8 is provided, so that the reflected beams of light 17 do not enter in the direction to the light-receiving device 5.

Also, a part of the outgoing beams of light 21 emitted from the light-emitting device 4 does not enter the transmitting lens 6 so as to become stray light 18, and this stray light 18 scatters in the optical communication module 1. Since the light-receiving device 5 is optically separated from the receiving side (where the light-emitting device 4, etc. in FIG. 4 is provided) by the incoming light reflecting mirror 7 and the interference preventing section 8, it is possible to prevent the stray light 18 from being coupled with the light-receiving device 5.

Moreover, even if the misalignment of the light-emitting device 4 occurs due to the erection tolerance of the light-emitting device 4, unexpected stray light 18 does not enter the light-receiving device 5, so that the erection tolerance of the light-emitting device 4 can be increased and the manufacturing costs can be reduced.

Further, even if the reflected beams of light 17 also scatter inside the optical communication module 1 as stray light, these beams are not coupled with the light-receiving device 5 either, because of the foregoing reason. That is to say, the incoming light reflecting mirror 7 and the interference preventing section 8 reflect and collect the incoming beams of light 22 so as to couple the incoming beams of light 22 with the light-receiving device 5, and also the incoming light reflecting mirror 7 and the interference preventing section 8 optically separates the reflected beams of light 17 and the stray light 18 from the light-receiving device 5.

In addition, since the light-receiving device 5 is separated from the outgoing beams of light 21 by the incoming light reflecting mirror 7 and the interference preventing section 8, it is possible to determine the layout of the light-receiving device 5 without considering the influence of stray light, and this increases the degree of freedom for designing the optical communication module 1, and makes it possible to arrange the optical communication module 1 to be easily adjusted when manufacturing the same.

Figure 5:
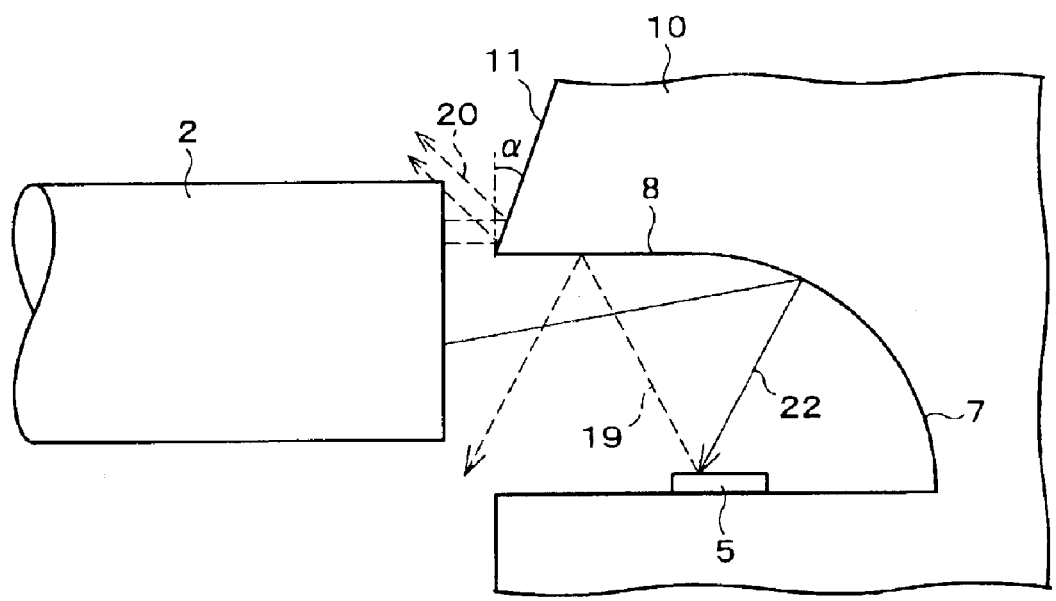
FIG. 5 is a schematic view, describing the principle of preventing far end reflection in the optical communication module in accordance with the present invention.

Next, the principle of preventing the interference due to the far end module reflection is discussed in reference to FIG. 5. In the optical communication module 1 in accordance with the present embodiment, there are mainly two causes of the far end module reflection, namely: the reflected beams of light 19 reflected in the surface of the light-receiving device 5 is coupled with the optical fiber 2; and a prism-reflected beam of light 20 which is a part of the incoming beams of light 22, which is emitted from the optical fiber 2, being reflected in the surface of the optical member 10 (mainly in the prism section 11) is coupled with the optical fiber 2 again.

The light-receiving surface of the light-receiving device 5 is generally covered with a thin-film such as silicon nitride in order to have antireflection coating for reducing the reflection of the incoming beams of light 22, so that the light receiving efficiency of the surface is improved. However, it is difficult to completely prevent the reflection in the light-receiving device 5, and also the reflectance could increase in accordance with the incident angle of the incoming beams of light 22.

Most of the reflected beams of light 19 are arranged so as to be reflected in the direction to the interference preventing section 8, and the reflected beam of light 19 reflected in the interference preventing section 8 is arranged so as not to be coupled with the optical fiber 2. For this reason, it is possible to restrain the interference due to the far end module reflection.

Figure 6:
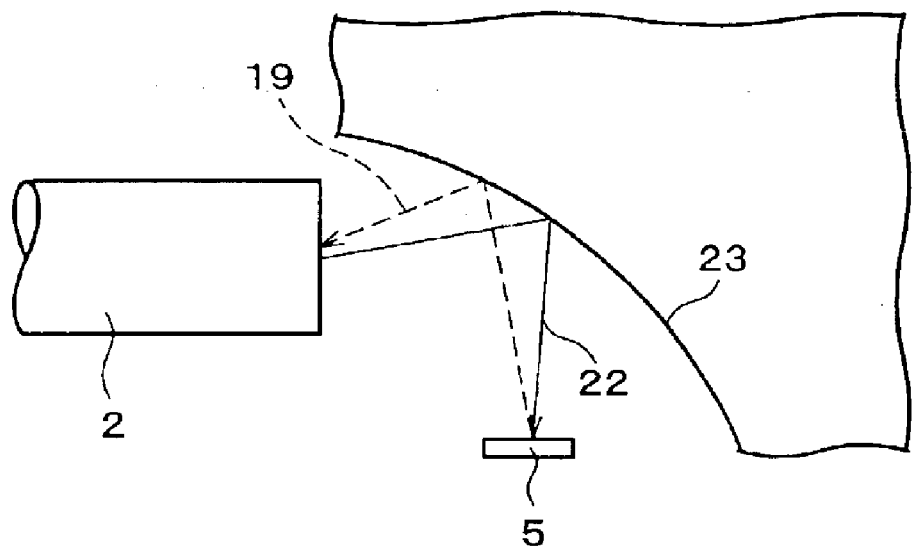
FIGS. 6(a) and 6(b) are schematic views for comparing a conventional art with the present invention.
Figure 6:
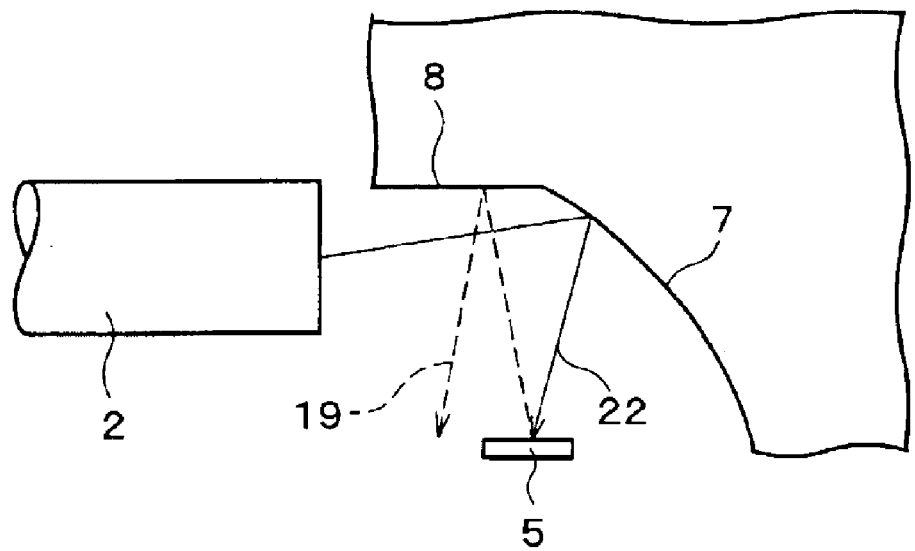

Now, an optical communication module using a conventional collection mirror 23 is compared to the present embodiment as follows. As illustrated in FIG. 6(a), the shape of the conventional collection mirror 23 is, for instance, spheroid, and highly efficient receiving is realized by providing the optical fiber 2 and the light-receiving device 5 at respective two focal points of the spheroid.

However, when the conventional collection mirror 23 is adopted (FIG. 6(a)), the reflected beam of light 19 is reflected in the collection mirror 23 so as to be re-coupled with the optical fiber 2, and hence the interference due to the far end module reflection is generated.

In contrast, when the incoming light reflecting mirror 7 and the interference preventing section 8 are adopted as in the present embodiment (FIG. 6(b)), the reflected beam of light 19 is reflected in the interference preventing section 8 so as to head for the direction not being coupled with the optical fiber 2, and thus the coupling with the optical fiber 2 can be prevented.

The incoming light reflecting mirror 7 has a curved surface such as spheroid and sphere, and the interference preventing section 8 is in the shape of cylinder continued from the curved surface. When the curvature and shape of the interference preventing section 8 are different from those of the incoming light reflecting mirror 7, it is easy to prevent the reflected beams of light 19 from returning to the optical fiber 2. Incidentally, for the sake of comparison with the conventional arrangement, the arrangement in FIG. 6(b) does not correspond to the single fiber full-duplex method (only receiving the incoming beams of light 22 from the optical fiber 2).

When particularly focusing on the reduction of the interference due to the far end module reflection, the interference preventing section 8 may have low reflectance (high light absorption factor). Absorbing the reflected beam of light 19 enables to prevent the far end module reflection with more certainty.

However, when a part of the incoming beams of light 22 from the optical fiber 2 is also emitted to the interference preventing section 8 so as to be coupled with the light-receiving device 5, it is possible to acquire higher reflection efficiency. In this case, it is preferable that the reflectance of the interference preventing section 8 is arranged so as to be high.

Moreover, since the mirror film of the incoming light reflecting mirror 7 can be formed simultaneously with the mirror film of the interference preventing section 8, it is preferable to adopt an identical mirror film for both of these members in light of productivity. Alternatively, rather than being provided in combination with the incoming light reflecting mirror 7, the interference preventing section 8 may be provided in the optical communication module 1 so as to be separated from the incoming light reflecting mirror 7.

However, to correspond to the single fiber bi-directional communications, it is preferable that the incoming light reflecting mirror 7 and the interference preventing section 8 are provided in combination with each other, because, if the transmitting area is not clearly separated from the receiving area, the interferences due to the near end reflection and the internal scattering tend to increase. The interference preventing section 8 prevents the interference due to the far end module reflection, and in addition to this, the interference preventing section 8 clearly separates the transmitting area from the receiving area so as to prevent the interference between these areas.

Next, referring to FIG. 7(*a*), an arrangement of the incoming light reflecting mirror 7 and the interference preventing section 8 is described below. Provided that: the intersection point of the extension of the optical axis of the optical fiber 2 in the direction to the incoming light reflecting mirror 7 and the incoming light reflecting mirror 7 is A; and the center of the light-receiving surface of the light-receiving device 5 is B, it is preferable that B is closer to the optical fiber 2 than A, and the interference preventing section 8 is provided so as to be closer to the optical fiber 2 than A.

Figure 7:
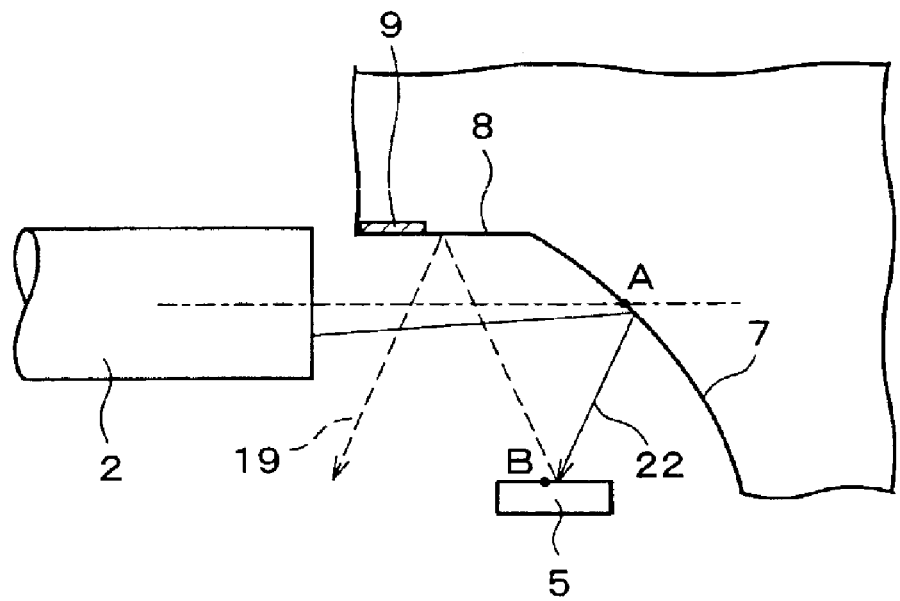
FIGS. 7(a) and 7(b) are schematic views illustrating an arrangement of an incoming light reflecting mirror and an interference restraining section in accordance with the present invention, and FIG. 7(a) indicates a case when the interference restraining section is on the side closer to an optical fiber with respect to the incoming light reflecting mirror, while FIG. 7(b) indicates a case when the interference restraining section is on the side further from the optical fiber with respect to the incoming light reflecting mirror.
Figure 7:
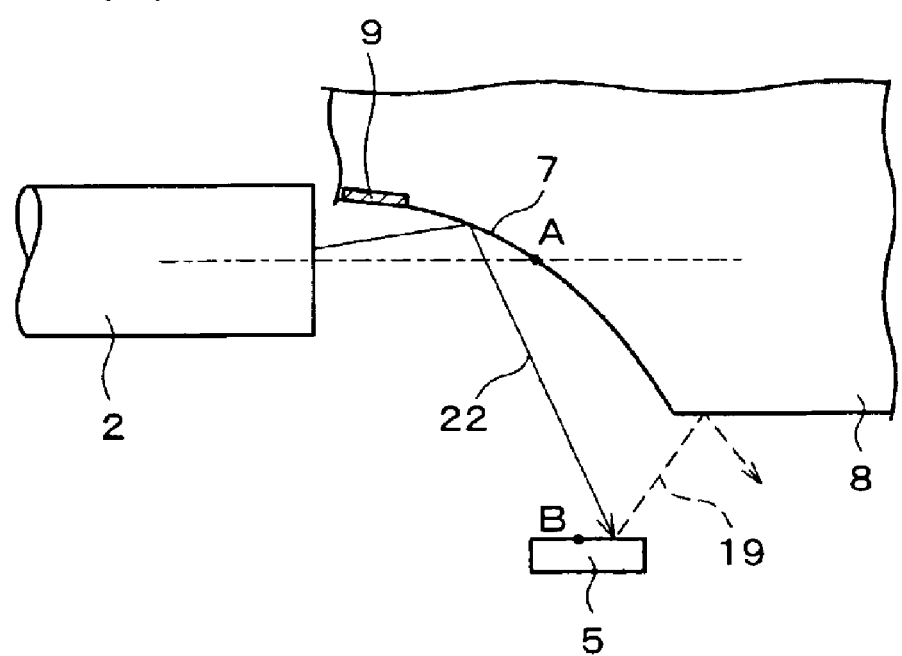

With this arrangement, most of the incoming beams of light 22 which are reflected in the incoming light reflecting mirror 7 head for the direction to the optical fiber 2 (to the left side of FIG. 7(*a*)), i.e. do not go beyond a plane at A, which is perpendicular to the optical axis, so as to enter the light-receiving device 5. On this account, the reflected beams of light 19 are also reflected so as to head for the direction to the optical fiber 2, where the interference preventing section 8 is provided. This interference preventing section 8 is designed so as to reflect the reflected beams of light 19 to the direction not being coupled with the optical fiber 2, and hence it is possible to prevent the far end module reflection.

Moreover, as illustrated in FIG. 7(*b*), there is a possible arrangement such that A is provided so as to be closer to the optical fiber 2 than B, and the interference preventing section 8 is provided so as to be farther from the optical fiber 2 than A. In this arrangement, contrary to the arrangement in FIG. 7(*a*), it is possible to prevent the far end module reflection by reflecting the reflected beam of light 19 to be away from the optical fiber 2, as illustrated in FIG. 7(*b*). Furthermore, in the arrangement of FIG. 7(*b*), a part of the incoming light reflecting mirror 7 is the shade section 9, so that the interference due to the near end reflection can be prevented.

As to the prism-reflected beam of light 20, optimizing the angle of gradient of the prism section 11 makes it possible to prevent the prism-reflected beam of light 20 from being coupled with the optical fiber 2, even if the prism-reflected beam of light 20 enters the optical fiber 2. That is to say, in order to realize this, the prism-reflected beam of light 20 is arranged so as to enter the optical fiber 2 at an angle larger than the numerical aperture of the optical fiber 2, i.e. an angle a of gradient (c.f. FIG. 5) of the prism section 11 is arranged so as to be not less than a value more or less equivalent to the NA (numerical aperture) of the optical fiber 2. For instance, on the occasion of using an optical fiber 2 whose NA is 0.3, the angle α a is not less than 10°, more preferably not less than 17°.

However, when the angle α of the prism section 11 is increased, the incident angle of the outgoing beams of light 21 with respect to the optical fiber 2 is also increased, and hence, in some instances, the coupling efficiency of the outgoing beams of light 21 is deteriorated and excitation occurs only in modes of high order. Thus, it is necessary to determine the angle α of the prism section 11 in light of the balance between the angle α and the incident angle of the outgoing beams of light 21.

Figure 8:
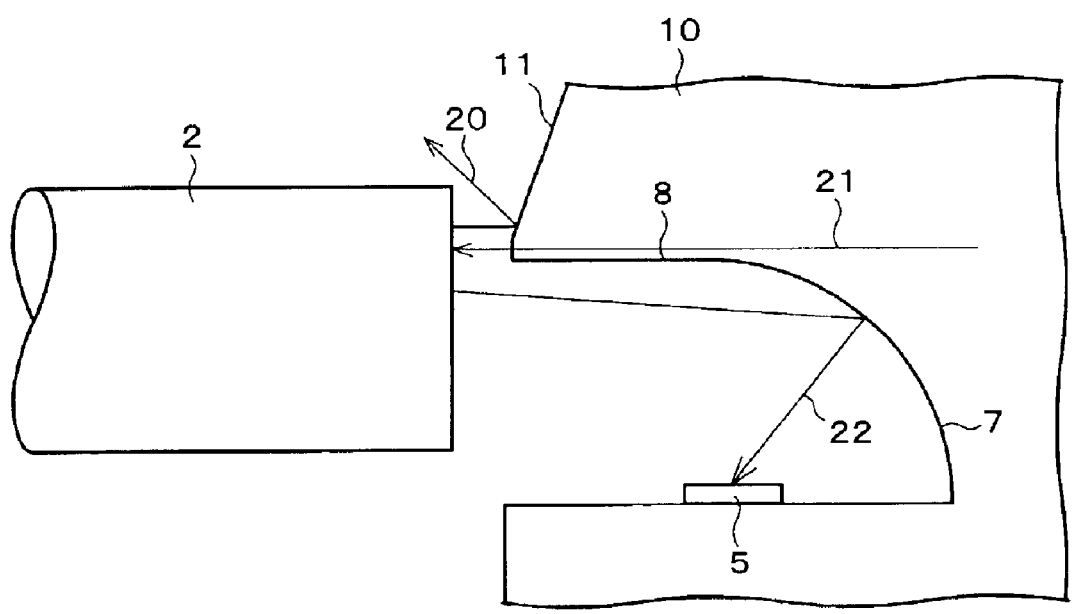
FIG. 8 is a schematic view, illustrating a prism section of the optical communication module in accordance with the present invention.

Moreover, as illustrated in FIG. 8, there is a possible arrangement such that an area of the optical member 10, where the outgoing beams of light 21 pass through, is arranged so as to be an end face perpendicular to the optical axis of the optical fiber 2 and not to be provided with the prism section 11, and only in a section where the outgoing beams of light 21 do not pass through, the prism section 11 having a large angle of gradient is formed. In this case, The prism-reflected beam of light 20 emitted from the area where the prism section 11 is not formed causes the far end reflection, but it is possible to restrain the influence of this by sufficiently downsizing the area.

Alternatively, there is another possible arrangement such that the angle of gradient of the prism section 11 in the area where the outgoing beams of light 21 pass through is small, while the angle of gradient of the prism section 11 in other areas is large (i.e. forming the prism section 11 to have two tiers). Also, the surface of the optical member 10, the surface being irradiated with the incoming beams of light 22 (the surface on which the prism section 11 being formed), may be covered with an AR (antireflection) coating in order to reduce the reflectance.

Next, the interference due to the far end reflection of the optical fiber 2 is described below. As illustrated in FIG. 1, when the end face of the optical fiber 2 is perpendicular to the optical axis, the far end reflection around 4% of the amount of emitted light is caused by the difference of refraction between the optical fiber 2 and air. This far end reflection can be reduced by changing the shape of the end face of the optical fiber 2.

Figure 9:
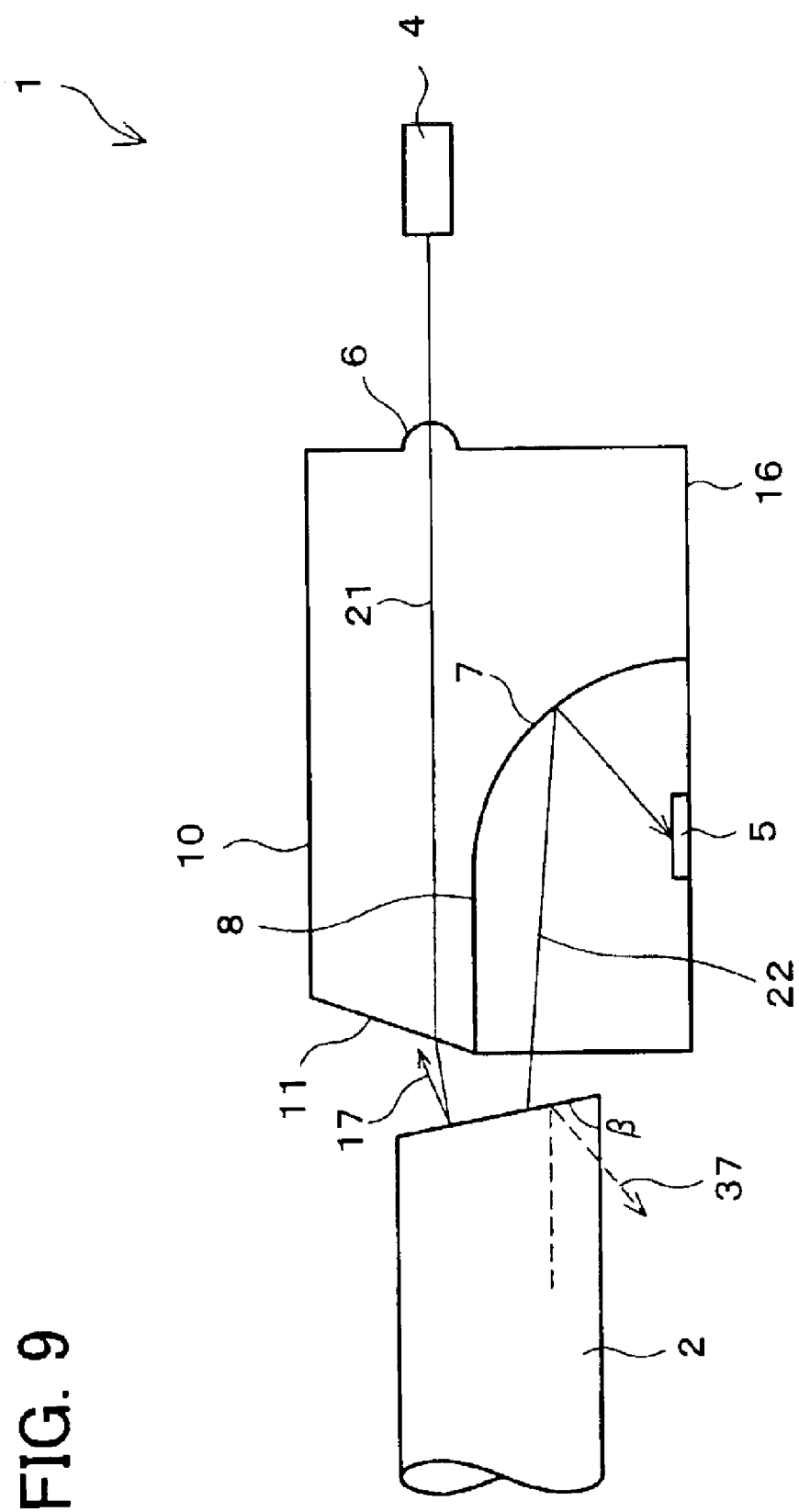
FIG. 9 is a schematic view, illustrating an arrangement in which an optical fiber of the optical communication module has a tilted end face.
Figure 10:
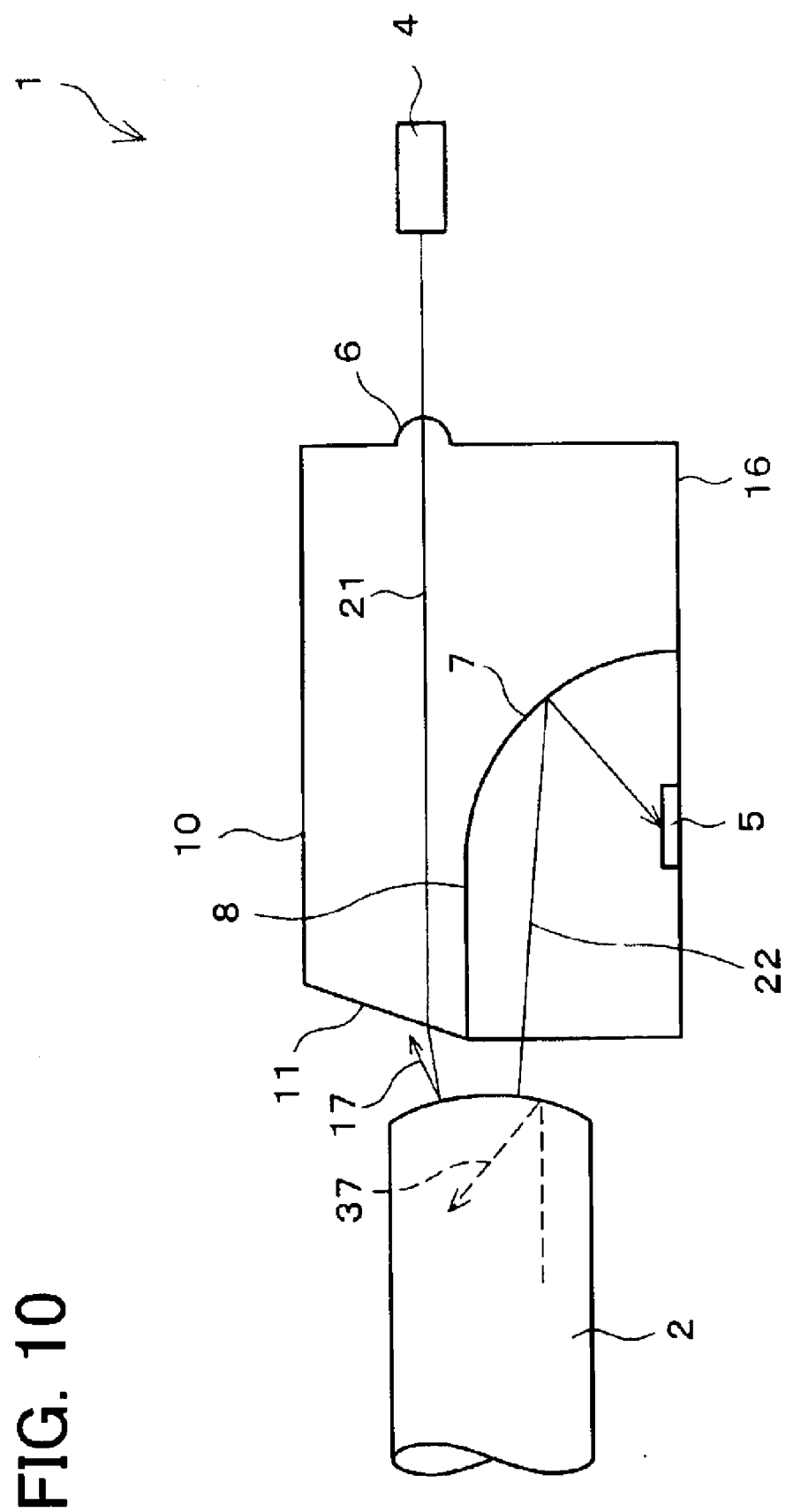
FIG. 10 is a schematic view, illustrating an arrangement in which an optical fiber of the optical communication module has a spherical end face.

For instance, there are following two methods to achieve the reduction of the far end reflection, namely: to cause the end face of the optical fiber 2 to be tilted with respect to the optical axis as illustrated in FIG. 9; and to form the end face of the optical fiber 2 to have a curved shape, as illustrated in FIG. 10. In both of these methods, the far end reflection light 37 is redirected on the end face of the optical fiber 2 so as to have an angle not less than the numerical aperture of the optical fiber 2, so that the far end reflection light 37 is not transmitted through the optical fiber 2.

The end face of a POF can be easily formed to have a tilted shape or a spherical shape by pressing the end face on an arbitrarily shaped hot plate and melting the end face. The following description will discuss the optical coupling between the optical fiber 2 whose end face is modified as above and the optical communication module 1.

When the end face of the optical fiber 2 is tilted, as illustrated in FIG. 9, the side of the optical communication module 1, the side (upper side in FIG. 9) for emitting the outgoing beams of light 21, is set so as to correspond to the side of the optical fiber 2 where the cross section in the direction of the optical axis has an obtuse angle, and consequently the optical fiber 2 is coupled with the optical communication module 1. With this arrangement, the reflected beams of light 17, which are the outgoing beams of light 21 being reflected in the optical fiber 2, are reflected to the direction from the center to the periphery of the optical fiber 2, so that it is possible to reduce the interference due to the near end reflection with certainty.

Further, the incoming beams of light 22 emitted from the optical fiber 2 are refracted to the light-receiving device 5 (to the downward in FIG. 9) thanks to the shape of the end face of the optical fiber 2. On this account, a part of the beams of light emitted from the transmitting area also enters the incoming light reflecting mirror 7, and hence it is possible to further improve the reception efficiency. An angle β of gradient of the end face of the optical fiber 2 is arranged so as to be more or less identical with the numerical aperture of the optical fiber 2, so that the far end reflection can be reduced with certainty. Provided that the NA is 0.3 and the angle β is 80° in the optical fiber 2, the far end reflection is reduced to 0.4%.

When the end face of the optical fiber 2 has a curved shape (FIG. 10), since it is unnecessary to determine the correspondence between the optical fiber 2 and the optical communication module 1 as in the case of the tilted end face, the optical fiber 2 is easily detachable/attachable from/to the optical communication module 1. Moreover, the outgoing beams of light 21 enter the optical fiber 2 from an area close to the periphery so that it is possible to cause the reflected beams of light 17 to be reflected in the direction from the center to the periphery of the optical fiber 2 as in the case of the tilted end face, and hence the interference due to the near end reflection can be reduced with certainty. Further, since a part of the incoming beams of light 22 emitted from the optical fiber 2 is collected by the spherical end face of the optical fiber 2 so as to be emitted, it is possible to improve the reception efficiency.

Figure 11:
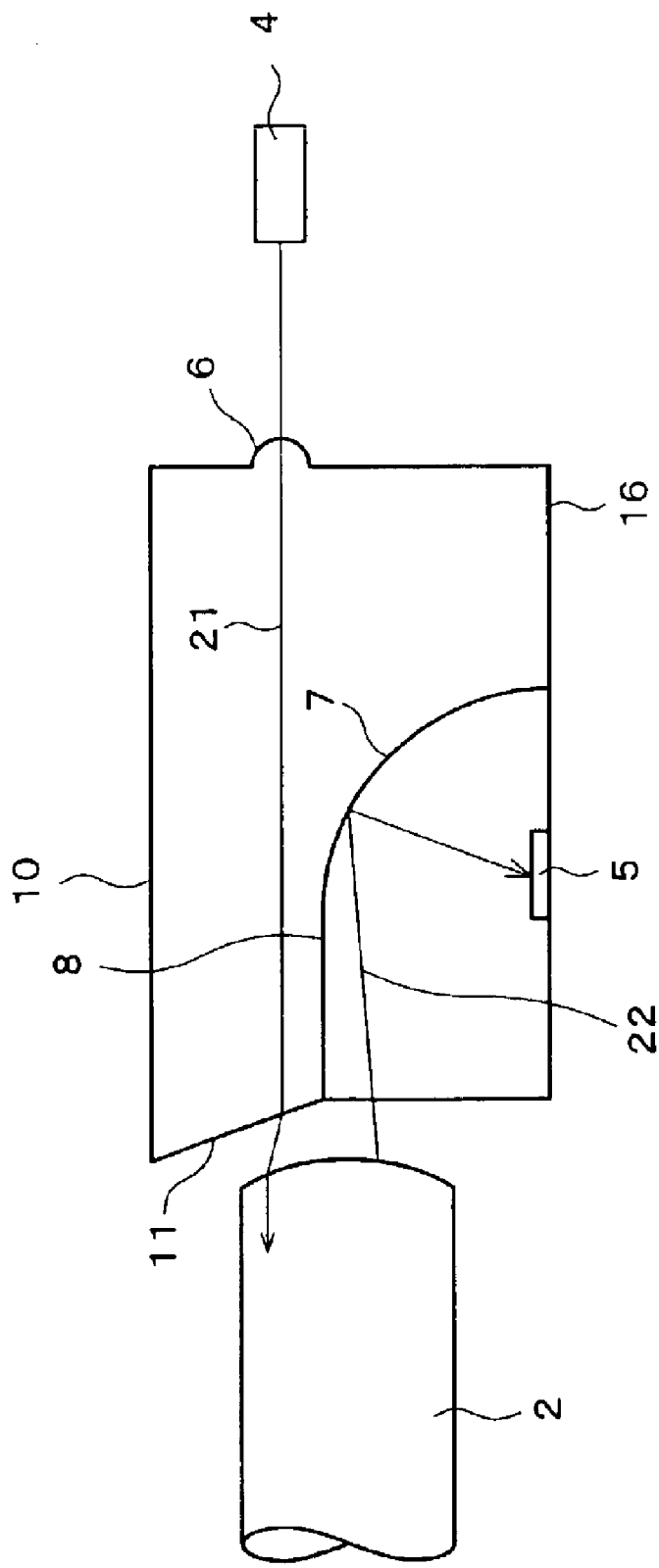
FIG. 11 is a schematic view, describing the shape of the prism of the optical communication module in accordance with the present invention.

When the end face of the optical fiber 2 has a tilted shape or a spherical shape, the outgoing beams of light 21 entering the optical fiber 2 are refracted because of the shape of the end face. To improve the coupling efficiency between the outgoing beams of light 21 and the optical fiber 2, it is necessary to lessen the angle of the refracted outgoing beams of light 21 with respect to the optical axis of the optical fiber 2. To realize this, the prism section 11 preferably has a tilted surface which is tilted to the opposition direction, as illustrated in FIG. 11. This tilted surface tilted to the opposition direction is arranged in such a manner that, with respect to a virtual plane perpendicular to the optical axis of the optical fiber 2, the tilted surface comes close to the optical fiber 2 with distances from the optical axis.

As described above, arranging the end face of the optical fiber 2 to have a tilted shape or a spherical shape makes it possible to reduce the interference due to the far end reflection, and hence it is possible to further improve the reception efficiency.

Next, the method of preventing electric and electromagnetic interferences is described below.

In FIG. 1, the stem 13 is connected to a grand electrode of the light-receiving device 5. The sub-mount 12 is made of insulating materials such as SiC, and the light-emitting device 4 is electrically isolated from the light-receiving device 5. The incoming light reflecting mirror 7 and the interference preventing section 8 are electrically connected to an electrode 16 which is provided in the lower part of the optical member 10, and hence electrically connected to the stem 13 via the electrode 16. That is to say, viewing from the light-emitting device 4, the light-receiving device 5 is shielded with the incoming light reflecting mirror 7, the interference preventing section 8, and the stem 13, and this arrangement enables to restrain electric and electromagnetic interferences.

The incoming light reflecting mirror 7 and the interference preventing section 8 are formed by depositing materials, which are conductive and have high-reflectance such as aluminum and gold, from the bottom of the optical member 10. At the same time, the electrode 16 is also formed. Since the incoming light reflecting mirror 7, the interference preventing section 8, and the electrode 16 form the whole bottom surface of the optical member 10, it is possible to easily form these members without carrying out patterning by a mask, etc.

Further, the light-emitting device 4 and a monitor photodiode 14 are covered with a transmitting area cover 15. This transmitting area cover 15 is adhered to the optical member 10 and the stem 13, in order to keep the light-emitting device 4 away from outside air. The transmitting area cover 15 is electrically connected to the stem 13 as well, for electromagnetically isolating the light-emitting device 4 from the outside. Since a part of the optical member 10 is used as a part of the sealant (equivalent to a conventional cover glass) of the light-emitting device 4, the number of components can be reduced and thus the costs for the components can be reduced and the manufacturing steps can be simplified.

Next, referring to FIG. 1, the components of the optical communication module 1 will be illustrated.

As the optical fiber 2, multi-mode optical fibers such as a POF are preferably adopted. The POF has a core made of plastics having good light-transmitting property, such as PMMA (PolyMethylMethaAcrylate) and polycarbonate, and the clad thereof is composed of plastics whose refractive index is lower than the core.

In this optical fiber 2, unlike a quartz optical fiber, it is easy to enlarge the diameter of the core from around 200 μm to around 1 mm, and since this optical fiber 2 can be easily aligned so as to be connected to the optical communication module 1, it is possible to acquire a low-price bi-directional optical communication link 3. As described in the present embodiment, when spatially separating the incoming beams of light 22 from the outgoing beams of light 21, it is preferable to use an optical fiber 2 having a core around 1 mm in diameter.

Further, it is possible to adopt a PCF whose core is made of quartz glass and whose clad is made of polymer. Although the PCF is more expensive than the POF, the PCF is characterized by low transmitting losses and wide transmission band. For this reason, the use of the PCF as a transmission medium allows to acquire a bi-directional communications link 3 which enables to carry out long-distance communications and communications at higher speed. As a matter of course, a quartz optical fiber may be adopted.

As the light-emitting device 4, devices such as a semiconductor laser and a light emitting diode (LED) are adopted. It is preferable that the light-emitting device 4 operates at a wavelength at which the transmitting losses of the optical fiber 2 are small, and is low-cost. For instance, when adopting a POF as the optical fiber 2, it is possible to adopt devices such as a semiconductor laser operating at a wavelength of 650 nm, which can be acquired at low price due to the volume production for apparatuses such as DVDs. Also, the monitor photodiode 14 is provided in the rear part of the light-emitting device 4, for keeping the quantity of light from the light-emitting device 4 constant.

As the light-receiving device 5, photodiodes, which convert the intensity of received modulated light to an electric signal and are sensitive in the wavelength band of the light-emitting device 4, are adopted, so that the photodiodes are such as a PIN photodiode made of silicon and an avalanche photodiode.

Figure 12:
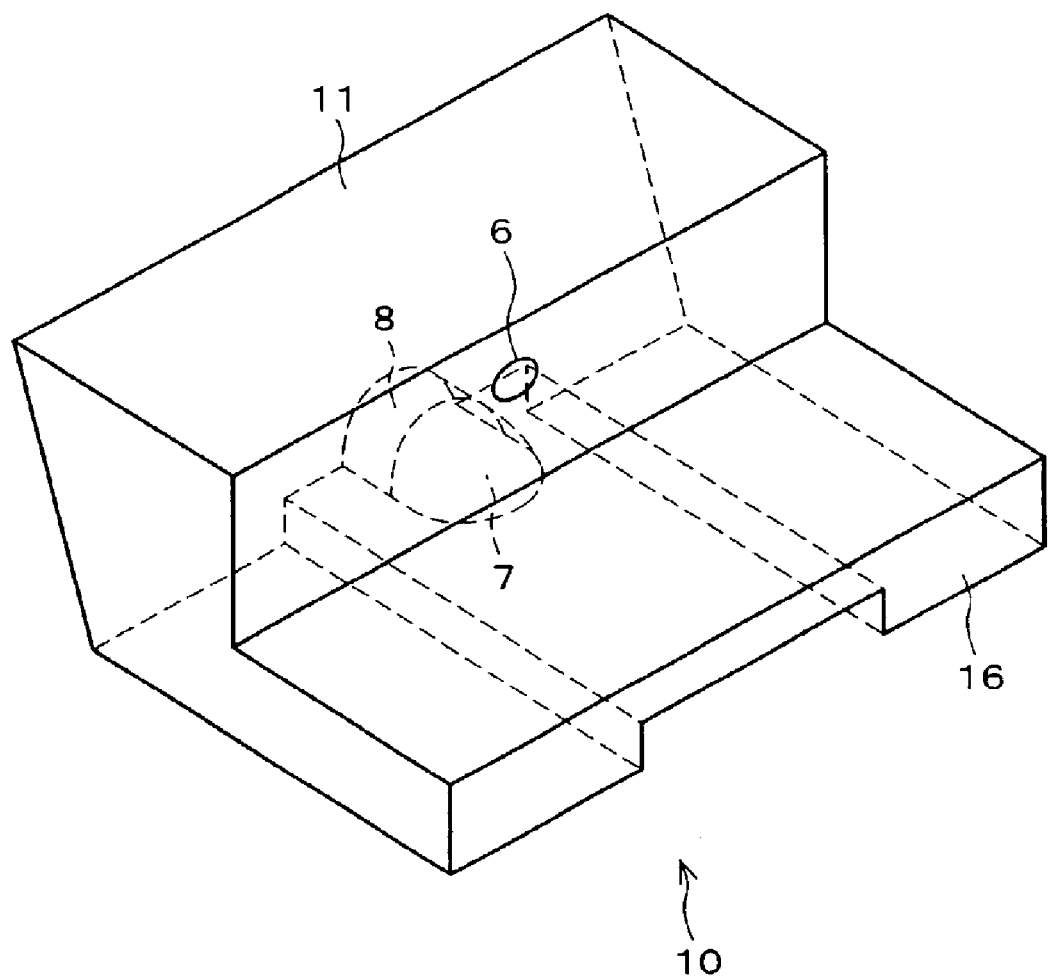
FIG. 12 is a perspective view, illustrating an example of an optical member in accordance with the present invention.

FIG. 12 illustrates an example of the optical member 10. This optical member 10 is made of plastics such as PMMA and polycarbonate, and manufactured by methods such as injection molding. This optical member 10 is arranged in such a manner that, on the reflective surfaces of the incoming light reflecting mirror 7 and the interference preventing section 8, a metal thin-film with high reflectance, made of a material such as aluminum and gold, is formed by methods such as depositing. By depositing the metal from the bottom of the optical member 10, the incoming light reflecting mirror 7 and the interference preventing section 8 are easily formed without carrying out patterning using a mask, etc.

On the bottom surface, for making contact with the stem 13, of the optical member 10, the electrode 16 is provided (reverse side of the optical member 10 in FIG. 12). The electrode 16 is formed by methods such as depositing, simultaneously with the incoming light reflecting mirror 7 and the interference preventing section 8. At least a part of the electrode 16 is (electrically) connected to the incoming light reflecting mirror 7 and the interference preventing section 8. It is preferable that the incoming light reflecting mirror 7 and the interference preventing section 8 are formed so as to be joined with each other. When these members are joined with each other, no optical losses are caused between these members, the reception efficiency is improved, and the interferences due to the internal scattering and the far end module reflection are surely reduced.

Further, the arrangement above makes it easy to manufacture a die, and hence the productivity is improved. The incoming light reflecting mirror 7 has a shape of a curved surface such as a part of a spheroid and a sphere, and the interference preventing section 8 is the extension from the curved surface. With this arrangement, it is easy to manufacture the incoming light reflecting mirror 7 and the interference preventing section 8 by molding, and this enables to acquire an optical communication module 1 with excellent manufacturability. The optical member 10 is provided with: the transmitting lens 6 for collecting the outgoing beams of light 21 so as to couple the same with the optical fiber 2; the prism section 11 for refracting the outgoing beams of light 21 so as to cause the outgoing beams of light 21 to enter the optical fiber 2; and a convexo concave section (not illustrated) for aligning the light-emitting device 4 with the light-receiving device 5.

In this manner, since various functions are imparted to the optical member 10, it is possible to significantly reduce the number of components and the tolerance on the occasion of constructing, and hence a low-cost and small-sized optical communication module 1 can be acquired.

Moreover, The light-emitting device 4, the light-receiving device 5, and the optical member 10 can be provided on a single stem 13, in parallel with the optical axis of the optical fiber 2. With this arrangement, complicated manufacturing steps are not required so that the number of the manufacturing steps can be reduced.

As in the foregoing descriptions, using the optical communication module 1 in accordance with First Embodiment makes it possible to realize full-duplex bi-directional optical communications with a single optical fiber 2, since the interferences due to the near end reflection, the far end reflection, the far end module reflection, and the internal scattering caused by stray light are prevented and electric and electromagnetic interferences are reduced.

In particular, since the reception efficiency is high thanks to the incoming light reflecting mirror 7 and the interference preventing section 8, the interference due to the far end module reflection is reduced and hence a high SN ratio can be acquired. Moreover, since various functions are imparted to the optical member 10, it is possible to acquire an optical communication module 1 which is low-cost, small in size, and easily manufactured.

The present embodiment is merely an example so that the present invention is not limited to this arrangement. The present invention is characterized in that the far end module reflection is reduced by the interference preventing section 8, and for instance, it is possible to acquire similar effects using other collecting optical systems such as a lens, instead of the incoming light reflecting mirror 7.

[Second Embodiment]

Figure 13:
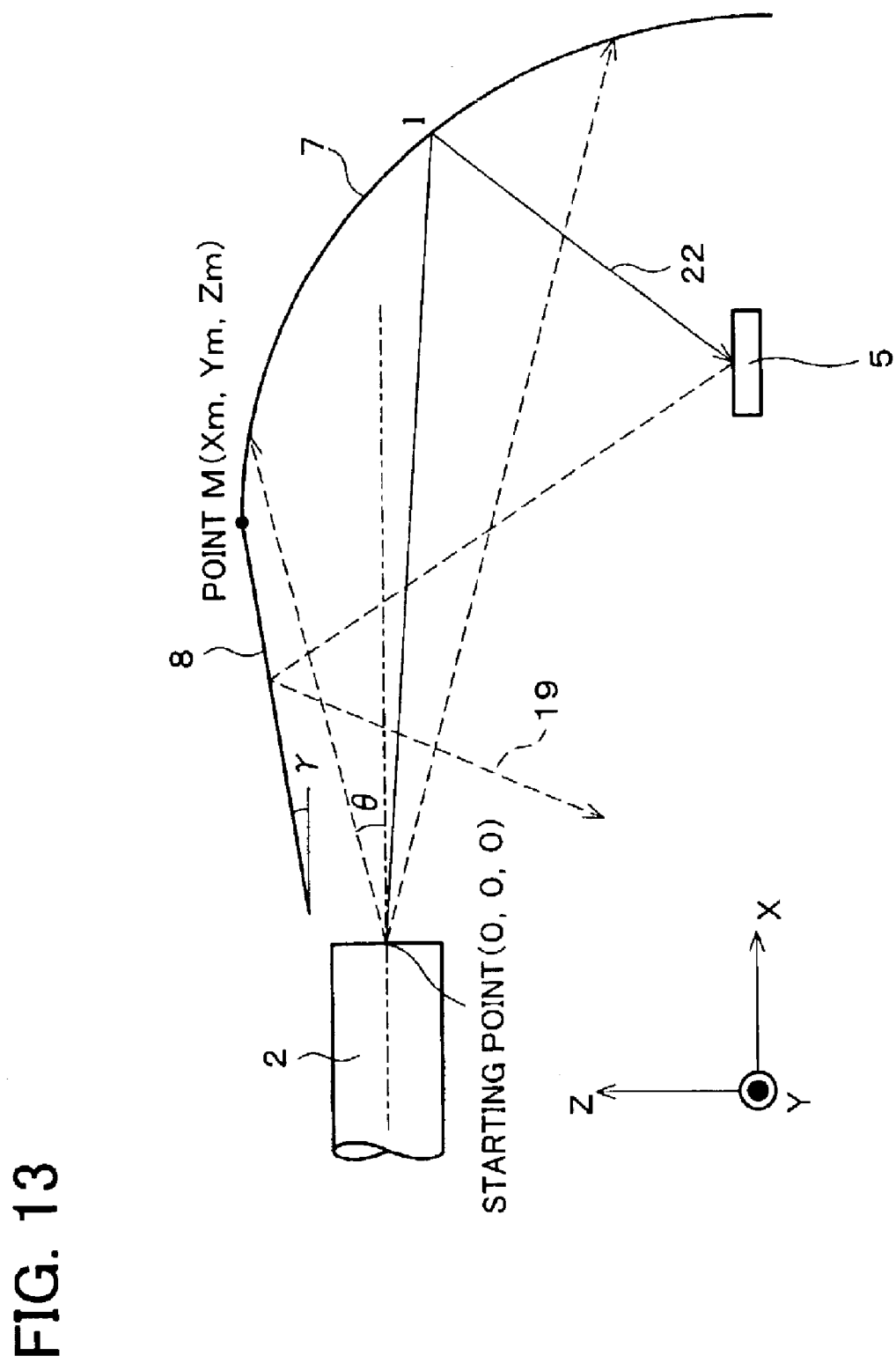
FIG. 13 is a schematic view, illustrating an arrangement of Second Embodiment of the optical communication module in accordance with the present invention.

Now, referring to FIG. 13, Second Embodiment will be described below. In this embodiment, members having the same functions as those described in First Embodiment are given the same numbers, so that the descriptions are omitted for the sake of convenience.

First Embodiment has illustrated an example of the optical communication module 1 corresponding to single fiber full-duplex communications. In contrast, the present embodiment illustrates an example of an optical communication module 1 corresponding to single fiber half-duplex communications. FIG. 13 is a schematic view showing the optical communication module 1 in accordance with the present embodiment. The optical communication module 1 in FIG. 13 is provided in a receiving side of the single fiber half-duplex method.

Incoming beams of light 22 emitted from a module (not illustrated) located at the far end of the line exit the optical fiber 2, and most of the beams are reflected in an incoming light reflecting mirror (collecting optical system) 7 so as to be collected, and consequently coupled with a light-receiving device 5. Most of the reflected beams of light 19 are reflected in the light-receiving device 5, then reflected in an interference preventing section 8 to the direction not being coupled with an optical fiber 2, and thus the beams of light reflected in the interference preventing section 8 are not coupled with the optical fiber 2.

In the single fiber half-duplex communications method, the interference due to the far end module reflection does not directly causes the decrease of the SN ratio as in the case of the single fiber full-duplex communications. However, as light returns to a light-emitting device of the module located at the far end of the line, the oscillation becomes unstable and the outgoing light (incoming beams of light 22) tends to include a noise. For this reason, the interference preventing section 8 prevents the optical fiber 2 from being coupled with the reflected beam of light 19, and thus it is possible to acquire a more stable optical communication link.

Next, an arrangement of an incoming light reflecting mirror 7 and an interference preventing section 8 is described. The incoming beams of light 22 are emitted from the optical fiber 2 at a radiation angle (Sin θ=numerical aperture (NA)) which is determined in accordance with the NA of the optical fiber 2. To improve the reception efficiency, it is necessary to layout the members so as to cause most of the incoming beams of light 22 to irradiate the incoming light reflecting mirror 7.

To achieve this, it is necessary to layout the incoming light reflecting mirror 7 so as to cause all beams of light emitted from the optical fiber 2 at the radiation angle of θ to head for the incoming light reflecting mirror 7. That is to say, the shape and arrangement of the incoming light reflecting mirror 7 are determined so that the emitting point (center of the optical axis of the optical fiber 2) of the optical fiber 2 is assumed as a starting point (0, 0, 0), the direction in parallel to the optical axis of the optical fiber 2 is X, two directions perpendicular to X and orthogonal to each other are Y and Z, and an arbitrary point M (Xm, Ym, Zm) located on the circumference of the incoming light reflecting mirror 7 always satisfies the following equation;

$$(Ym^2+Zm^2)^{1/2}/Xm \geq \mathrm{Tan}\,(\theta) = \mathrm{Tan}\,(\mathrm{ArcSin}\,(NAp))$$

Then the interference preventing section 8 is provided at an arbitrary location of the circumference. As illustrated in FIG. 13, the interference preventing section 8 is tilted with respect to the optical axis of the optical fiber 2, towards the optical fiber 2. With this arrangement, it is possible to prevent the reflected beams of light 19 from returning to the optical fiber 2 with more certainty. In this case, the angle γ of gradient is preferably less than θ, since the incoming beams of light 22 towards the incoming light reflecting mirror 7 are obstructed when the angle γ is not less than θ.

Figure 14:
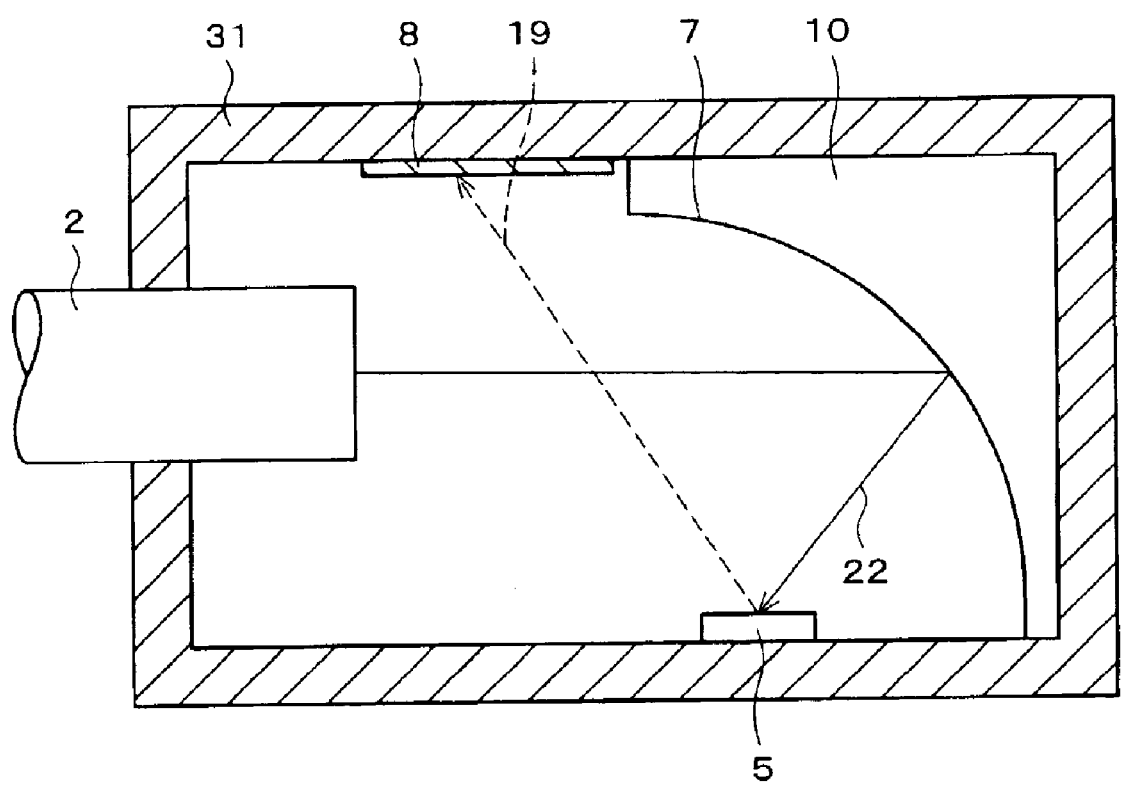
FIG. 14 is a schematic view, illustrating an arrangement of Second Embodiment of the optical communication module in accordance with the present invention.

Moreover, as illustrated in FIG. 14, instead of forming the interference preventing section 8 in combination with the incoming light reflecting mirror 7, it is possible to, for instance, form the interference preventing section 8 on a frame 31 of the optical communication module 1. In this case, the interference preventing section 8 is made of materials having high light absorption factor, so as to prevent the reflected beams of light 19 from returning to the optical fiber 2, by absorbing the same. This interference preventing section 8 is a part of the frame 31, and hence the number of components of the optical communication module 1 is reduced.

As in the forgoing description, the use of the optical communication module 1 of Second Embodiment enables to acquire an optical communication link which is stable, corresponds to the single fiber half-duplex communications, and has high reception efficiency, and with this optical communication link, the amount of returning light due to the reflected beams of light 19 is small. Incidentally, the optical communication module 1 described in the present embodiment is merely an example so that it is possible to arrange the optical communication module 1 in an alternative manner. Moreover, the optical communication module 1 of the present embodiment can be adopted to the single fiber full-duplex communications, by incorporating the arrangement of First Embodiment thereto.

[Third Embodiment]

Figure 15:
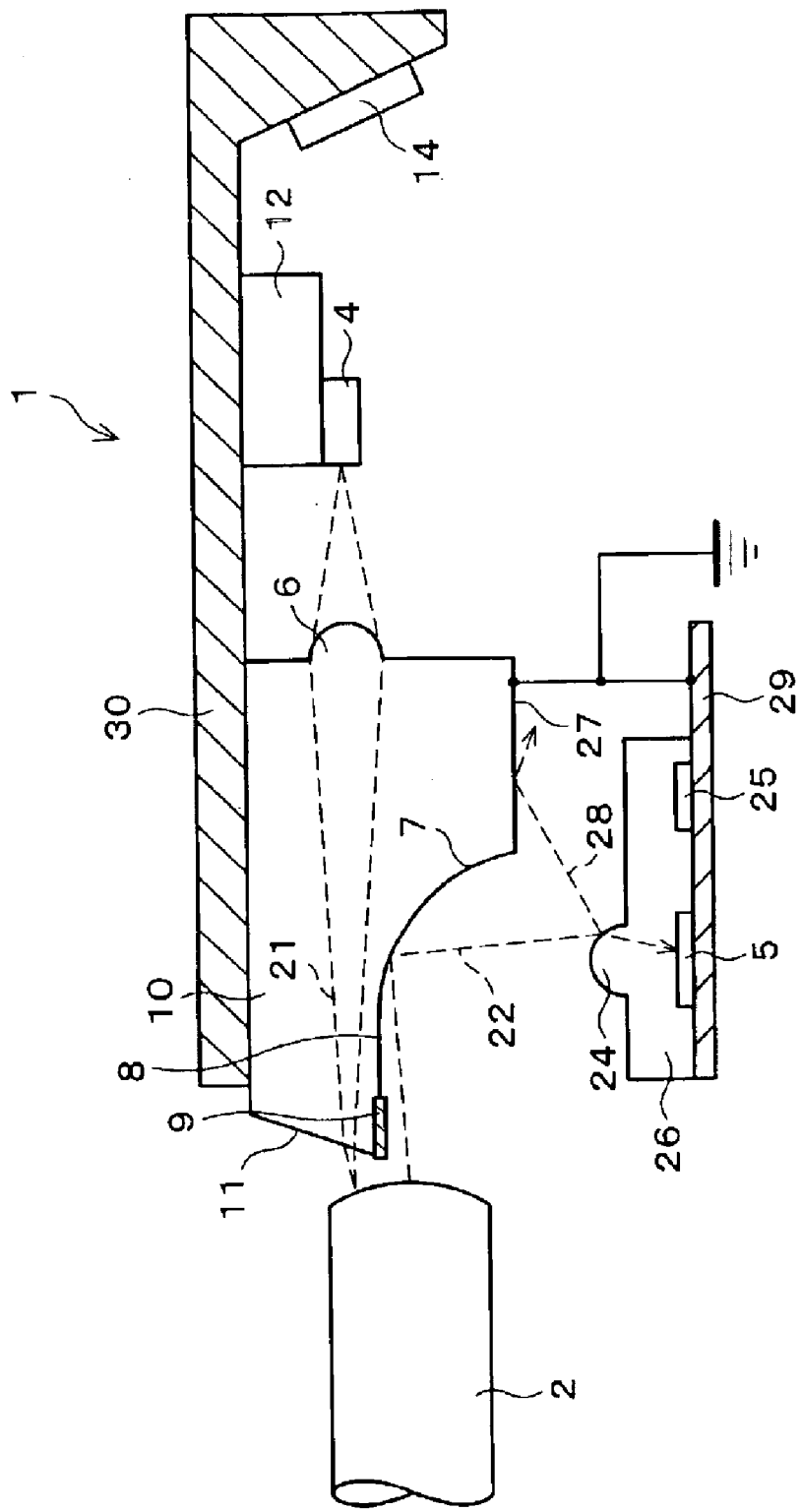
FIG. 15 is a schematic view, illustrating an arrangement of Third Embodiment of the optical communication module in accordance with the present invention.
Figure 16:
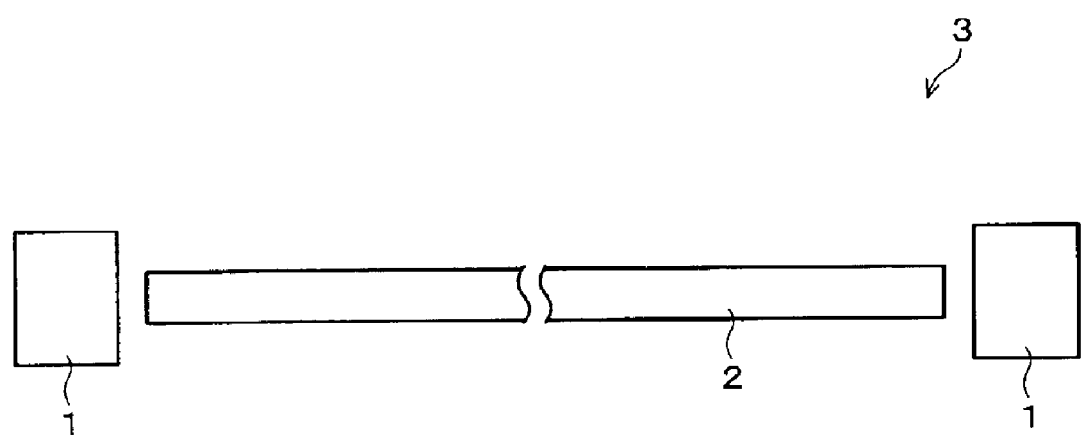
FIG. 16 is a schematic view, illustrating an arrangement of an optical communication link.

Now, Third Embodiment will be described in reference to FIG. 15. In this embodiment, members having the same functions as those described in the forgoing embodiments are given the same numbers, so that the descriptions are omitted for the sake of convenience.

Being similar to the optical communication module 1 of First Embodiment, an optical communication module 1 in accordance with the present embodiment can be adopted to single fiber full-duplex communications. In the present embodiment, incoming beams of light 22 collected by an incoming light reflecting mirror 7 are further collected by a receiving lens (second collecting optical system) 24, in order to further improve reception efficiency.

The receiving lens 24 is formed in combination with a molding section 26 for isolating a preamplifier 25 and a light-receiving device 5 from the outside air. Isolating the preamplifier 25 from the outside air enables to prevent the degradation of performances due to the change over time. Moreover, since the receiving lens 24 is provided in the molding section 26, the optical communication module 1 in accordance with the present can be downsized.

On the side opposite to the side where the interference preventing section 8 of the incoming light reflecting mirror 7 is provided, there is provided with a second interference preventing section 27. Although the interference due to the reflected beams of light from the receiving area is prevented according to a principle similar to the principle described in First Embodiment, the reflected beams of light from the receiving area (not illustrated), which are reflected in the light-receiving device 5, are not entirely reflected to the interference preventing section 8, so that a part of these reflected beams of light is reflected to different directions including the second interference preventing section 27. In particular, when the receiving lens 24 is provided, it is difficult to direct all reflected beams of light from the receiving area to a particular direction, and the reflected beams of light from the receiving area, which are reflected to the second interference preventing section 27, tend to increase.

The beams of the light having irradiated the second interference preventing section 27 are either reflected to directions other than the optical fiber 2 or absorbed. With this arrangement, it is possible to prevent the beams of light due to the far end module reflection from returning to the optical fiber 2.

Moreover, second reflected beams of light 28 from the receiving area, which are reflected in the receiving lens 24, also cause the far end module reflection. These second reflected beams of light 28 are reflected so as to be radiated because of the shape of the receiving lens 24, and thus it is difficult to direct the beams to a particular direction. To overcome this problem, the second interference preventing section 27 is provided in addition to the interference preventing section 8, so that the interference due to the far end module reflection caused by the second reflected beams of light 28 can be surely reduced.

Further, with this arrangement, it is possible to layout the incoming light reflecting mirror 7 and the receiving lens 24 more freely and this enables to design the optical communication module 1 easily, compared to the arrangement for reducing the interference due to the far end module reflection only by the interference preventing section 8 as illustrated in First Embodiment. In the present arrangement, although the second interference preventing section 27 is provided on the right side of the incoming light reflecting mirror 7 in FIG. 15 (i.e. the second interference preventing section 27 is provided along the optical axis of the optical fiber 2 and the receiving reflecting mirror 7 is provided between the optical fiber 2 and the second interference preventing section 27), two second interference preventing sections 27 may be provided on the both sides of the optical fiber 2, along the optical axis of the optical fiber 2.

Moreover, the second interference preventing section 27 performs as an electrode 16. A part of the second interference preventing section 27 is electrically connected to: the incoming light reflecting mirror 7; the interference preventing section 8; the light-receiving device 5; and a grand electrode 29 of the preamplifier 25. Further, as described in First Embodiment, the second interference preventing section 27 also prevents the interferences due to the internal scattering and electric and electromagnetic reasons, by optically and electrically separating the light-emitting device 4 from the light-receiving device 5.

The light-emitting device 4 and a sub-mount 12 are provided on a transmitting stem 30. The transmitting stem 30 is provided so as to be aligned with a part of the optical member 10. The transmitting stem 30 is electrically isolated from the grand electrode 29 in the receiving side, and also the transmitting stem 30 dissipates the heat of the light-emitting device 4.

As described above, the bi-directional optical communication module 1 in accordance with Third Embodiment can exhibit: improved reception efficiency by concurrently using the collection mirror and the receiving lens; facility to prevent the interferences due to the far end module reflection, the internal scattering, the near end reflection, and other electric and electromagnetic reasons; and stable performance with small size, low power consumption, and good durability.

To achieve the forgoing objective, the optical communication module in accordance with the present invention is characterized by comprising a receiving optical section, which is for coupling the beams of light emitted from an optical fiber with a light-receiving device, including: a collecting optical system for directing at least a part of beams of light, which is emitted from the optical fiber, to the light-receiving device; and at least one interference restraining section for restraining module-reflected beams of light reflected in a part of the optical communication module from being coupled with the optical fiber, the at least one interference restraining section being provided in an area irradiated with at least a part of the module-reflected beams of light.

According to this arrangement, incoming light is efficiently coupled with the light-receiving device by the collecting optical system and the interference restraining section restrains the module-reflected beams of light from being coupled with the optical fiber again, and hence it is possible to reduce adverse effects of the returned light on the module located at the far end of the line, so as to acquire an optical communication link which stably operates.

In addition to the above, the forgoing optical communication module may be arranged in such a manner that the collecting optical system is a reflecting mirror for reflecting the beams of light emitted from the optical fiber so as to lead the beams of light to the light-receiving device.

According to this arrangement, it is possible to arbitrarily layout the optical system of the optical communication module by changing the direction of the beams of light by means of the reflecting mirror, so that the degree of freedom for designing the optical communication module can be increased.

The forgoing optical communication module may be arranged in such a manner that the collecting optical system has a curved surface, and is provided for reflecting the beams of light emitted from the optical fiber so as to collect the beams, and consequently leading the beams to the light-receiving device.

With this arrangement, it is possible to couple the incoming light emitted from the optical fiber with the light-receiving device more efficiently.

Moreover, the forgoing optical communication module may be arranged in such a manner that the at least one interference restraining section is a light-absorber, for restraining the module-reflected beams of light from being coupled with the optical fiber, by absorbing the module-reflected beams of light.

According to this arrangement, absorbing the module-reflected beams of light makes it possible to surely restrain the module-reflected beams of light from returning to the optical fiber.

Moreover, the forgoing optical communication module may be arranged in such a manner that the at least one interference restraining section is a reflecting mirror for restraining the module-reflected beams of light from being coupled with the optical fiber, by reflecting the module-reflected beams of light.

According to this arrangement, the module-reflected beams of light are reflected to directions other than the optical fiber so that it is possible to restrain the module-reflected beams of light from returning to the optical fiber, and also the incoming light irradiating the at least one interference restraining section can be coupled with the light-receiving device as well, and hence it is possible to improve the reception efficiency. Further, the collecting optical system can be formed simultaneously with the reflecting mirror of the interference restraining section, and this enables to reduce the costs.

Moreover, the forgoing optical communication module is preferably arranged in such a manner that the at least one interference restraining section has curvature different from curvature of the collecting optical system.

With this arrangement, the curvature of the at least one interference restraining section can be appropriately arranged in order to further restrain the module-reflected beams of light, which are reflected in the at least one interference restraining section, from returning to the optical fiber. Also, with the forgoing arrangement, it is possible to secure a transmitting area and thus the optical communication module can be adopted to single fiber bi-directional optical communications.

The forgoing optical communication module is preferably arranged in such a manner that the collecting optical system and the at least one interference restraining section are provided in combination with each other.

With this arrangement, it is possible to reduce the loss of light between the collecting optical system and the at least one interference restraining section so as to improve reception efficiency, and also the interferences due to internal scattering and far end module reflection can be surely reduced. Furthermore, the arrangement above makes it easy to manufacture a die, and hence the productivity is improved.

Moreover, the forgoing optical communication module may be arranged in such a manner that a center of a light-receiving section of the light-receiving device and the at least one interference restraining section are provided so as to be closer to the optical fiber than an intersection point of the collecting optical system and an extension of an optical axis of the optical fiber.

According to this arrangement, the reflected incoming light can be reflected from the collecting optical system to the optical fiber in a sequential manner, and hence it is possible to surely restrain the interference due to far end module reflection.

Moreover, the forgoing optical communication module may be arranged in such a manner that an intersection point of the collecting optical system and an extension of an optical axis of the optical fiber is provided so as to be closer to the optical fiber than a center of a light-receiving section of the light-receiving device and the at least one interference restraining section.

According to this arrangement, the module-reflected beams of light can be reflected from the collecting optical system to the direction opposite to the optical fiber in a sequential manner, and hence it is possible to surely restrain the interference due to far end module reflection.

Moreover, the forgoing optical communication module may be arranged in such a manner that one of the at least one interference restraining section is provided on the side of the optical fiber of the collecting optical system and another of the at least one interference restraining section is provided on the side opposite to the side of the optical fiber.

With this arrangement, it is possible to restrain the beams of light caused by the far end module reflection from returning to the optical fiber with more certainty. In particular, since second module-reflected beams of light generated on occasions when a lens is provided as a second optical system are restrained, it is possible to improve the reception efficiency by concurrently using the lens and the collecting optical system. Further, the collecting optical system and the lens are disposed more freely, and this increases the easiness of designing the optical communication module.

Moreover, in the forgoing optical communication module, the at least one interference restraining section may have a shape such as an end face of the collecting optical system is elongated towards an optical axis of the optical fiber. This arrangement makes it easy to manufacture a die, and hence the productivity is improved.

Moreover, the forgoing optical communication module may be arranged in such a manner that the at least one interference restraining section reflects at least a part of the beams of light emitted from the optical fiber so as to lead the at least a part of the beams of light to the light-receiving device.

In this arrangement, the at least one interference restraining section also contributes to the receiving so that the reception efficiency can be further improved.

Moreover, the forgoing optical communication module may be arranged in such a manner that the at least one interference restraining section reflects at least a part of the beams of light emitted from the optical fiber so as to lead the at least a part of the beams of light to the light-receiving device.

With this arrangement, it is possible to improve the reception efficiency by concurrently using two collecting optical systems, and this increases the degree of freedom for disposing the collecting optical systems, so that it becomes easy to design the optical communication module.

Moreover, the forgoing optical communication module may be arranged in such a manner that the second collecting optical system is formed so as to be integrated with a molding section for separating the light-receiving device from outside air.

With this arrangement, the light-receiving device is separated from the outside air so that the degradation of performances due to the change over time is restrained. Further, since the second optical system is formed so as to be integrated with the molding section, it is possible to downsize the optical communication module.

Moreover, the forgoing optical communication module is preferably arranged in such a manner that, provided that a center of an end face of the optical fiber is a starting point $(0, 0, 0)$, an optical axis of the optical fiber is X, two directions perpendicular to X are Y and Z, an arbitrary point located on a circumference of the collecting optical system is $(Xm, Ym, Zm)$, and a numerical aperture of the optical fiber is NAp, an equation; $(Ym^2+Zm^2)^{1/2}/Xm \geq \mathrm{Tan}(\mathrm{ArcSin}(\mathrm{NAp}))$ is always satisfied.

According to this arrangement, since the equation above is satisfied, most of the incoming beams of light emitted from the optical fiber irradiate the collecting optical system, and hence it is possible to improve the reception efficiency.

To achieve the forgoing objective, the single fiber bi-directional optical communication module in accordance with the present invention, used for an optical communication link which transmits or receives an optical signal using a single optical fiber, is characterized by comprising: a light-emitting device for generating outgoing light; a light-receiving device for receiving beams of light emitted from the optical fiber; a transmitting optical section for coupling the beams of light emitted from the light-emitting device with the optical fiber; and a receiving optical section for coupling the beams of light emitted from the optical fiber with the light-receiving device, wherein the receiving optical section has any one of the forgoing arrangements.

With this arrangement, since the receiving optical section in accordance with the present invention is provided, it is possible to acquire a single fiber bi-directional optical communication module which can correspond to single fiber full-duplex communications and has high reception efficiency, and in which interference due to far end module reflection is low.

Moreover, the single fiber bi-directional optical communication module may be arranged in such a manner that the light-emitting device is optically separated from the light-receiving device by either one of the collecting optical system and the interference restraining section, for restraining the forgoing outgoing light and outgoing light reflected in the optical fiber from being coupled with the light-receiving device.

With this arrangement, it is possible to restrain the interferences due to near end reflection and internal scattering, so that a high SN ratio can be acquired even in the case of single fiber full-duplex communications. Further, since the transmitting section is optically separated from the receiving section, it is possible to determine the layout of these sections without considering the influence of optical interference between these two, and this makes it possible to increase the degree of freedom-for designing the optical communication link.

Moreover, the single fiber bi-directional optical communication module may be arranged in such a manner that the transmitting optical section is formed so as to be integrated with the receiving optical section.

With this arrangement, it is possible to acquire a single fiber bi-directional communication module which is small in size, good in productivity, and manufactured with low costs.

Moreover, the single fiber bi-directional optical communication module may be arranged in such a manner that either one of the transmitting optical system and the interference restraining section is electrically connected to an electrode of the light-receiving device.

According to this arrangement, since the collecting optical system or the interference restraining section electrically separates the light-emitting device from the light-receiving device, it is possible to restrain the interferences due to an electric or electromagnetic noise in the optical communication link.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An optical communication module, comprising:
   an optical fiber;
   a light-receiving device for converting beams of light emitted from the optical fiber to an electric signal; and
   a receiving optical section for coupling the beams of light emitted from the optical fiber with the light-receiving device,
      wherein, the receiving optical section includes: a collecting optical system for directing at least a part of beams of light, which is emitted from the optical fiber, to the light-receiving device; and at least one interference restraining section for restraining module-reflected beams of light reflected in a part of the optical communication module from being coupled with the optical fiber, said at least one interference restraining section being provided in an area irradiated with at least a part of the module-reflected beams of light; and
      wherein the collecting optical system is a reflecting mirror for reflecting the beams of light emitted from the optical fiber so as to lead the beams of light to the light-receiving device.

2. The optical communication module as defined in claim 1, wherein the collecting optical system has a curved surface, and is provided for reflecting the beams of light emitted from the optical fiber so as to collect the beams, and consequently leading the beams to the light-receiving device.

3. The optical communication module as defined in claim 1, wherein said at least one interference restraining section is a light-absorber, for restraining the module-reflected beams of light from being coupled with the optical fiber, by absorbing the module-reflected beams of light.

4. An optical communication module, comprising:
   an optical fiber;
   a light-receiving device for converting beams of light emitted from the optical fiber to an electric signal; and
   a receiving optical section for coupling the beams of light emitted from the optical fiber with the light-receiving device,
   wherein, the receiving optical section includes:
      a collecting optical system for directing at least a part of beams of light, which is emitted from the optical fiber, to the light-receiving device,
      at least one interference restraining section for restraining module-reflected beams of light reflected in a part of the optical communication module from being coupled with the optical fiber, said at least one interference restraining section being provided in an area irradiated with at least a part of the module-reflected beams of light, and
      wherein said at least one interference restraining section is a reflecting mirror for restraining the module-reflected beams of light from being coupled with the optical fiber, by reflecting the module-reflected beams of light.

5. The optical communication module as defined in claim 4, wherein said at least one interference restraining section has curvature different from curvature of the collecting optical system.

6. The optical communication module as defined in claim 4, wherein said at least one interference restraining section reflects at least a part of the beams of light emitted from the optical fiber so as to lead said at least a part of the beams of light to the light-receiving device.

7. The optical communication module as defined in claim 1, wherein the collecting optical system and said at least one interference restraining section are provided in combination with each other.

8. An optical communication module, comprising:
   an optical fiber;
   a light-receiving device for converting beams of light emitted from the optical fiber to an electric signal; and
   a receiving optical section for coupling the beams of light emitted from the optical fiber with the light-receiving device,
   wherein, the receiving optical section includes: a collecting optical system for directing at least a part of beams of light, which is emitted from the optical fiber, to the light-receiving device; and at least one interference restraining section for restraining module-reflected beams of light reflected in a part of the optical communication module from being coupled with the optical fiber, said at least one interference restraining section being provided in an area irradiated with at least a part of the module-reflected beams of light; and
   wherein a center of a light-receiving section of the light-receiving device and said at least one interference restraining section are provided so as to be closer to the optical fiber than an intersection point of the collecting optical system and an extension of an optical axis of the optical fiber.

9. The optical communication module as defined in claim 1, wherein an intersection point of the collecting optical system and an extension of an optical axis of the optical fiber is provided so as to be closer to the optical fiber than a center of a light-receiving section of the light-receiving device and said at least one interference restraining section.

10. The optical communication module as defined in claim 1, wherein said at least one interference restraining section is provided so as to sandwich the collecting optical system, along an optical axis of the optical fiber.

11. The optical communication module as defined in claim 1, wherein said at least one interference restraining section has a shape such as an end face the collecting optical system is elongated towards an optical axis of the optical fiber, in a direction parallel to an optical axis of the optical fiber.

12. An optical communication module, comprising:
   an optical fiber;
   a light-receiving device for converting beams of light emitted from the optical fiber to an electric signal; and
   a receiving optical section for coupling the beams of light emitted from the optical fiber with light-receiving device,
   wherein, the receiving optical section includes:
      a collecting optical system for directing at least a part of beams of light, which is emitted from the optical fiber, to the light-receiving device,
      at least one interference restraining section for restraining module-reflected beams of light reflected in a part of the optical communication module from being coupled with the optical fiber, said at least one interference restraining section being provided in an area irradiated with at least a part of the module-reflected of light, and
      a second collecting optical system that is provided between the collecting optical system and the light-receiving device, and said at least one interference restraining section is provided in an area irradiated with at least a part of second module-reflected beams of light reflected in the second collecting optical system.

13. The optical communication module as defined in claim 12, wherein the second collecting optical system is formed so as to be integrated with a molding section for separating the light-receiving device from outside air.

14. The optical communication module as defined in claim 1, wherein, provided that a center at an end face of the optical fiber is a starting point (0, 0, 0), an optical axis of the optical fiber is X, two directions perpendicular to X are Y and Z, an arbitrary point located on a circumference of the collecting optical system is (Xm, Ym, Zm), and a numerical aperture of the optical fiber is NAp, the collecting optical system satisfies $(Ym^2+Zm^2)^{1/2}/Xm \geq Tan(ArcSin(NAp))$.

15. A single fiber bi-directional optical communication module used for an optical communication link which transmits or receives an optical signal using a single optical fiber, comprising:

a light-emitting device for generating outgoing light;

a light-receiving device for receiving beams of light emitted from the optical fiber;

a transmitting optical section for coupling the beams of light emitted from the light-emitting device with the optical fiber; and a receiving optical section for coupling the beams of light emitted from the optical fiber with the light-receiving device, wherein, the receiving optical section includes:

a collecting optical system being configured to reflect at least a part of the beams of light emitted from the optical fiber to the light-receiving device; and an interference restraining section for restraining module-reflected beams of light reflected in a part of the optical communication module from being coupled with the optical fiber, the interference restraining section being provided in an area irradiated with at least a part of the module-reflected beams of light.

16. The single fiber bi-directional optical communication module as defined in claim 15, wherein the light-emitting device is optically separated from the light-receiving device by at least either one of the collecting optical system and the interference restraining section, for restraining said outgoing light and outgoing light reflected in the optical fiber from being coupled with the light-receiving device.

17. The single fiber bi-directional optical communication module as defined in claim 15, wherein the transmitting optical section is formed so as to be integrated with the receiving optical section.

18. An optical communication module, comprising:

an optical fiber;

a light-receiving device for converting beams of light emitted from the optical fiber to an electric signal; and a receiving optical section for coupling the beams of light emitted from the optical fiber with the light-receiving device, wherein, the receiving optical section includes: a collecting optical system for directing at least a part of beams of light, which is emitted from the optical fiber, to the light-receiving device; and at least one interference restraining section for restraining module-reflected beams of light reflected in a part of the optical communication module from being coupled with the optical fiber, said at least one interference restraining section being provided in an area irradiated with at least a part of the module-reflected beams of light; and wherein at least either one of the collecting optical system and the interference restraining section is electrically connected to an electrode of the light-receiving device.

19. The single fiber bi-directional optical communication module as defined in claim 15, wherein the collecting optical system and the interference restraining section are arranged so the light-emitting device is optically separated from the light-receiving device by the collecting optical system and the interference restraining section, and so said outgoing light and outgoing light reflected in the optical fiber are not coupled to the light-receiving device.

* * * * *